United States Patent
Muhsin et al.

(10) Patent No.: US 12,236,767 B2
(45) Date of Patent: Feb. 25, 2025

(54) MACHINE LEARNING BASED MONITORING SYSTEM

(71) Applicant: Masimo Corporation, Irvine, CA (US)

(72) Inventors: Bilal Muhsin, Irvine, CA (US); Richard Priddell, Irvine, CA (US); Valery G. Telfort, Irvine, CA (US); Naoki Kokawa, Tustin, CA (US); Ammar Al-Ali, San Juan Capistrano, CA (US); Mohammad Usman, Mission Viejo, CA (US)

(73) Assignee: Masimo Corporation, Irvine, CA (US)

( * ) Notice: Subject to any disclaimer, the term of this patent is extended or adjusted under 35 U.S.C. 154(b) by 71 days.

(21) Appl. No.: 18/153,108

(22) Filed: Jan. 11, 2023

(65) Prior Publication Data
US 2023/0222887 A1    Jul. 13, 2023

Related U.S. Application Data

(60) Provisional application No. 63/299,168, filed on Jan. 13, 2022, provisional application No. 63/298,569, filed on Jan. 11, 2022.

(51) Int. Cl.
*G08B 21/04* (2006.01)
*G06T 7/00* (2017.01)
(Continued)

(52) U.S. Cl.
CPC .......... *G08B 21/043* (2013.01); *G06T 7/0012* (2013.01); *G06T 7/70* (2017.01); *G06T 7/90* (2017.01); *G06V 10/764* (2022.01); *G06V 10/774* (2022.01); *G06V 20/52* (2022.01); *G06V 40/10* (2022.01); *G06V 40/168* (2022.01);
(Continued)

(58) Field of Classification Search
CPC .............. G08B 21/043; G08B 21/0208; G08B 21/0294; G08B 21/0492; G06T 7/0012; G06T 7/70; G06T 7/90; G06T 2207/10016; G06T 2207/20081; G06T 2207/30041; G06T 2207/30201; G06T 2207/30232; G06T 7/246; G06V 10/764; G06V 10/774;
(Continued)

(56) References Cited

U.S. PATENT DOCUMENTS 4,960,128 A    10/1990 Gordon et al.
4,964,408 A    10/1990 Hink et al.
(Continued)

OTHER PUBLICATIONS

US 2024/0016391 A1, 01/2024, Lapotko et al. (withdrawn)

*Primary Examiner* — Michael E Teitelbaum
(74) *Attorney, Agent, or Firm* — Knobbe, Martens, Olson & Bear, LLP

(57) ABSTRACT

Systems and methods are provided for machine learning based monitoring. Image data from a camera is received. On the hardware accelerator, a person detection model based on the image data is invoked. The person detection model outputs first classification result. Based on the first classification result, a person is detected. Second image data is received from the camera. In response to detecting the person, a fall detection model is invoked on the hardware accelerator based on the second image data. The fall detection model outputs a second classification result. A potential fall based on the second classification result is detected. An alert is provided in response to detecting the potential fall.

18 Claims, 12 Drawing Sheets

(51) Int. Cl.
　　*G06T 7/70*　　　　(2017.01)
　　*G06T 7/90*　　　　(2017.01)
　　*G06V 10/764*　　　(2022.01)
　　*G06V 10/774*　　　(2022.01)
　　*G06V 20/52*　　　 (2022.01)
　　*G06V 40/10*　　　 (2022.01)
　　*G06V 40/16*　　　 (2022.01)
　　*G06V 40/20*　　　 (2022.01)
　　*G08B 21/02*　　　 (2006.01)
　　*G10L 25/51*　　　 (2013.01)

(52) U.S. Cl.
　　CPC ............ *G06V 40/172* (2022.01); *G06V 40/20* (2022.01); *G08B 21/0208* (2013.01); *G08B 21/0294* (2013.01); *G08B 21/0492* (2013.01); *G10L 25/51* (2013.01); *G06T 2207/10016* (2013.01); *G06T 2207/20081* (2013.01); *G06T 2207/30041* (2013.01); *G06T 2207/30201* (2013.01); *G06T 2207/30232* (2013.01)

(58) Field of Classification Search
　　CPC ...... G06V 20/52; G06V 40/10; G06V 40/168; G06V 40/172; G06V 40/20; G10L 25/51
　　See application file for complete search history.

(56) References Cited

U.S. PATENT DOCUMENTS

| | | | |
|---|---|---|---|
| 5,319,355 A | 6/1994 | Russek | |
| 5,337,744 A | 8/1994 | Branigan | |
| 5,341,805 A | 8/1994 | Stavridi et al. | |
| D353,195 S | 12/1994 | Savage et al. | |
| D353,196 S | 12/1994 | Savage et al. | |
| 5,377,676 A | 1/1995 | Vari et al. | |
| D359,546 S | 6/1995 | Savage et al. | |
| 5,431,170 A | 7/1995 | Mathews | |
| 5,436,499 A | 7/1995 | Namavar et al. | |
| D361,840 S | 8/1995 | Savage et al. | |
| D362,063 S | 9/1995 | Savage et al. | |
| D363,120 S | 10/1995 | Savage et al. | |
| 5,456,252 A | 10/1995 | Vari et al. | |
| 5,479,934 A | 1/1996 | Imran | |
| 5,482,036 A | 1/1996 | Diab et al. | |
| 5,494,043 A | 2/1996 | O'Sullivan et al. | |
| 5,533,511 A | 7/1996 | Kaspari et al. | |
| 5,561,275 A | 10/1996 | Savage et al. | |
| 5,590,649 A | 1/1997 | Caro et al. | |
| 5,602,924 A | 2/1997 | Durand et al. | |
| 5,638,816 A | 6/1997 | Kiani-Azarbayjany et al. | |
| 5,638,818 A | 6/1997 | Diab et al. | |
| 5,645,440 A | 7/1997 | Tobler et al. | |
| 5,671,914 A | 9/1997 | Kalkhoran et al. | |
| 5,726,440 A | 3/1998 | Kalkhoran et al. | |
| D393,830 S | 4/1998 | Tobler et al. | |
| 5,743,262 A | 4/1998 | Lepper, Jr. et al. | |
| 5,747,806 A | 5/1998 | Khalil et al. | |
| 5,750,994 A | 5/1998 | Schlager | |
| 5,758,644 A | 6/1998 | Diab et al. | |
| 5,760,910 A | 6/1998 | Lepper, Jr. et al. | |
| 5,890,929 A | 4/1999 | Mills et al. | |
| 5,919,134 A | 7/1999 | Diab | |
| 5,987,343 A | 11/1999 | Kinast | |
| 5,997,343 A | 12/1999 | Mills et al. | |
| 6,002,952 A | 12/1999 | Diab et al. | |
| 6,010,937 A | 1/2000 | Karam et al. | |
| 6,027,452 A | 2/2000 | Flaherty et al. | |
| 6,040,578 A | 3/2000 | Malin et al. | |
| 6,066,204 A | 5/2000 | Haven | |
| 6,115,673 A | 9/2000 | Malin et al. | |
| 6,124,597 A | 9/2000 | Shehada et al. | |
| 6,128,521 A | 10/2000 | Marro et al. | |
| 6,129,675 A | 10/2000 | Jay | |
| 6,144,868 A | 11/2000 | Parker | |
| 6,152,754 A | 11/2000 | Gerhardt et al. | |
| 6,184,521 B1 | 2/2001 | Coffin, IV et al. | |
| 6,232,609 B1 | 5/2001 | Snyder et al. | |
| 6,241,683 B1 | 6/2001 | Macklem et al. | |
| 6,253,097 B1 | 6/2001 | Aronow et al. | |
| 6,255,708 B1 | 7/2001 | Sudharsanan et al. | |
| 6,280,381 B1 | 8/2001 | Malin et al. | |
| 6,285,896 B1 | 9/2001 | Tobler et al. | |
| 6,308,089 B1 | 10/2001 | von der Ruhr et al. | |
| 6,317,627 B1 | 11/2001 | Ennen et al. | |
| 6,321,100 B1 | 11/2001 | Parker | |
| 6,334,065 B1 | 12/2001 | Al-Ali et al. | |
| 6,360,114 B1 | 3/2002 | Diab et al. | |
| 6,368,283 B1 | 4/2002 | Xu et al. | |
| 6,411,373 B1 | 6/2002 | Garside et al. | |
| 6,415,167 B1 | 7/2002 | Blank et al. | |
| 6,430,437 B1 | 8/2002 | Marro | |
| 6,430,525 B1 | 8/2002 | Weber et al. | |
| 6,463,311 B1 | 10/2002 | Diab | |
| 6,470,199 B1 | 10/2002 | Kopotic et al. | |
| 6,487,429 B2 | 11/2002 | Hockersmith et al. | |
| 6,505,059 B1 | 1/2003 | Kollias et al. | |
| 6,525,386 B1 | 2/2003 | Mills et al. | |
| 6,526,300 B1 | 2/2003 | Kiani et al. | |
| 6,534,012 B1 | 3/2003 | Hazen et al. | |
| 6,542,764 B1 | 4/2003 | Al-Ali et al. | |
| 6,580,086 B1 | 6/2003 | Schulz et al. | |
| 6,584,336 B1 | 6/2003 | Ali et al. | |
| 6,587,196 B1 | 7/2003 | Stippick et al. | |
| 6,587,199 B1 | 7/2003 | Luu | |
| 6,595,316 B2 | 7/2003 | Cybulski et al. | |
| 6,597,932 B2 | 7/2003 | Tian et al. | |
| 6,606,511 B1 | 8/2003 | Ali et al. | |
| 6,635,559 B2 | 10/2003 | Greenwald et al. | |
| 6,639,668 B1 | 10/2003 | Trepagnier | |
| 6,640,116 B2 | 10/2003 | Diab | |
| 6,640,117 B2 | 10/2003 | Makarewicz et al. | |
| 6,658,276 B2 | 12/2003 | Kiani et al. | |
| 6,661,161 B1 | 12/2003 | Lanzo et al. | |
| 6,697,656 B1 | 2/2004 | Al-Ali | |
| 6,697,658 B2 | 2/2004 | Al-Ali | |
| RE38,476 E | 3/2004 | Diab et al. | |
| RE38,492 E | 4/2004 | Diab et al. | |
| 6,738,652 B2 | 5/2004 | Mattu et al. | |
| 6,760,607 B2 | 7/2004 | Al-Ali | |
| 6,788,965 B2 | 9/2004 | Ruchti et al. | |
| 6,816,241 B2 | 11/2004 | Grubisic | |
| 6,822,564 B2 | 11/2004 | Al-Ali | |
| 6,850,787 B2 | 2/2005 | Weber et al. | |
| 6,850,788 B2 | 2/2005 | Al-Ali | |
| 6,876,931 B2 | 4/2005 | Lorenz et al. | |
| 6,920,345 B2 | 7/2005 | Al-Ali et al. | |
| 6,934,570 B2 | 8/2005 | Kiani et al. | |
| 6,943,348 B1 | 9/2005 | Coffin IV | |
| 6,956,649 B2 | 10/2005 | Acosta et al. | |
| 6,961,598 B2 | 11/2005 | Diab | |
| 6,970,792 B1 | 11/2005 | Diab | |
| 6,985,764 B2 | 1/2006 | Mason et al. | |
| 6,990,364 B2 | 1/2006 | Ruchti et al. | |
| 6,998,247 B2 | 2/2006 | Monfre et al. | |
| 7,003,338 B2 | 2/2006 | Weber et al. | |
| 7,015,451 B2 | 3/2006 | Dalke et al. | |
| 7,027,849 B2 | 4/2006 | Al-Ali | |
| D526,719 S | 8/2006 | Richie, Jr. et al. | |
| 7,096,052 B2 | 8/2006 | Mason et al. | |
| 7,096,054 B2 | 8/2006 | Abdul-Hafiz et al. | |
| D529,616 S | 10/2006 | Deros et al. | |
| 7,133,710 B2 | 11/2006 | Acosta et al. | |
| 7,142,901 B2 | 11/2006 | Kiani et al. | |
| 7,225,006 B2 | 5/2007 | Al-Ali et al. | |
| RE39,672 E | 6/2007 | Shehada et al. | |
| 7,254,429 B2 | 8/2007 | Schurman et al. | |
| 7,254,431 B2 | 8/2007 | Al-Ali et al. | |
| 7,254,434 B2 | 8/2007 | Schulz et al. | |
| 7,274,955 B2 | 9/2007 | Kiani et al. | |
| D554,263 S | 10/2007 | Al-Ali et al. | |
| 7,280,858 B2 | 10/2007 | Al-Ali et al. | |
| 7,289,835 B2 | 10/2007 | Mansfield et al. | |
| 7,292,883 B2 | 11/2007 | De Felice et al. | |
| 7,341,559 B2 | 3/2008 | Schulz et al. | |

(56) References Cited

U.S. PATENT DOCUMENTS

| | | |
|---|---|---|
| 7,343,186 B2 | 3/2008 | Lamego et al. |
| D566,282 S | 4/2008 | Al-Ali et al. |
| 7,356,365 B2 | 4/2008 | Schurman |
| 7,371,981 B2 | 5/2008 | Abdul-Hafiz |
| 7,373,193 B2 | 5/2008 | Al-Ali et al. |
| 7,377,794 B2 | 5/2008 | Al-Ali et al. |
| 7,395,158 B2 | 7/2008 | Monfre et al. |
| 7,415,297 B2 | 8/2008 | Al-Ali et al. |
| 7,438,683 B2 | 10/2008 | Al-Ali et al. |
| 7,483,729 B2 | 1/2009 | Al-Ali et al. |
| D587,657 S | 3/2009 | Al-Ali et al. |
| 7,500,950 B2 | 3/2009 | Al-Ali et al. |
| 7,509,494 B2 | 3/2009 | Al-Ali |
| 7,510,849 B2 | 3/2009 | Schurman et al. |
| 7,514,725 B2 | 4/2009 | Wojtczuk et al. |
| 7,519,406 B2 | 4/2009 | Blank et al. |
| D592,507 S | 5/2009 | Wachman et al. |
| 7,530,942 B1 | 5/2009 | Diab |
| 7,593,230 B2 | 9/2009 | Abul-Haj et al. |
| 7,596,398 B2 | 9/2009 | Al-Ali et al. |
| 7,606,608 B2 | 10/2009 | Blank et al. |
| 7,620,674 B2 | 11/2009 | Ruchti et al. |
| D606,659 S | 12/2009 | Kiani et al. |
| 7,629,039 B2 | 12/2009 | Eckerbom et al. |
| 7,640,140 B2 | 12/2009 | Ruchti et al. |
| 7,647,083 B2 | 1/2010 | Al-Ali et al. |
| D609,193 S | 2/2010 | Al-Ali et al. |
| D614,305 S | 4/2010 | Al-Ali et al. |
| 7,697,966 B2 | 4/2010 | Monfre et al. |
| 7,698,105 B2 | 4/2010 | Ruchti et al. |
| RE41,317 E | 5/2010 | Parker |
| RE41,333 E | 5/2010 | Blank et al. |
| 7,729,733 B2 | 6/2010 | Al-Ali et al. |
| 7,761,127 B2 | 7/2010 | Al-Ali et al. |
| 7,764,982 B2 | 7/2010 | Dalke et al. |
| D621,516 S | 8/2010 | Kiani et al. |
| 7,791,155 B2 | 9/2010 | Diab |
| RE41,912 E | 11/2010 | Parker |
| 7,880,626 B2 | 2/2011 | Al-Ali et al. |
| 7,909,772 B2 | 3/2011 | Popov et al. |
| 7,919,713 B2 | 4/2011 | Al-Ali et al. |
| 7,937,128 B2 | 5/2011 | Al-Ali |
| 7,937,129 B2 | 5/2011 | Mason et al. |
| 7,941,199 B2 | 5/2011 | Kiani |
| 7,957,780 B2 | 6/2011 | Lamego et al. |
| 7,962,188 B2 | 6/2011 | Kiani et al. |
| 7,976,472 B2 | 7/2011 | Kiani |
| 7,990,382 B2 | 8/2011 | Kiani |
| 8,008,088 B2 | 8/2011 | Bellott et al. |
| RE42,753 E | 9/2011 | Kiani-Azarbayjany et al. |
| 8,028,701 B2 | 10/2011 | Al-Ali et al. |
| 8,048,040 B2 | 11/2011 | Kiani |
| 8,050,728 B2 | 11/2011 | Al-Ali et al. |
| RE43,169 E | 2/2012 | Parker |
| 8,118,620 B2 | 2/2012 | Al-Ali et al. |
| 8,130,105 B2 | 3/2012 | Al-Ali et al. |
| 8,182,443 B1 | 5/2012 | Kiani |
| 8,190,223 B2 | 5/2012 | Al-Ali et al. |
| 8,203,438 B2 | 6/2012 | Kiani et al. |
| 8,203,704 B2 | 6/2012 | Merritt et al. |
| 8,219,172 B2 | 7/2012 | Schurman et al. |
| 8,224,411 B2 | 7/2012 | Al-Ali et al. |
| 8,229,532 B2 | 7/2012 | Davis |
| 8,233,955 B2 | 7/2012 | Al-Ali et al. |
| 8,255,026 B1 | 8/2012 | Al-Ali |
| 8,265,723 B1 | 9/2012 | McHale et al. |
| 8,274,360 B2 | 9/2012 | Sampath et al. |
| 8,280,473 B2 | 10/2012 | Al-Ali |
| 8,315,683 B2 | 11/2012 | Al-Ali et al. |
| RE43,860 E | 12/2012 | Parker |
| 8,346,330 B2 | 1/2013 | Lamego |
| 8,353,842 B2 | 1/2013 | Al-Ali et al. |
| 8,355,766 B2 | 1/2013 | MacNeish, III et al. |
| 8,374,665 B2 | 2/2013 | Lamego |
| 8,388,353 B2 | 3/2013 | Kiani et al. |
| 8,401,602 B2 | 3/2013 | Kiani |
| 8,414,499 B2 | 4/2013 | Al-Ali et al. |
| 8,418,524 B2 | 4/2013 | Al-Ali |
| 8,428,967 B2 | 4/2013 | Olsen et al. |
| 8,430,817 B1 | 4/2013 | Al-Ali et al. |
| 8,437,825 B2 | 5/2013 | Dalvi et al. |
| 8,455,290 B2 | 6/2013 | Siskavich |
| 8,457,707 B2 | 6/2013 | Kiani |
| 8,471,713 B2 | 6/2013 | Poeze et al. |
| 8,473,020 B2 | 6/2013 | Kiani et al. |
| 8,509,867 B2 | 8/2013 | Workman et al. |
| 8,515,509 B2 | 8/2013 | Bruinsma et al. |
| 8,523,781 B2 | 9/2013 | Al-Ali |
| D692,145 S | 10/2013 | Al-Ali et al. |
| 8,571,617 B2 | 10/2013 | Reichgott et al. |
| 8,571,618 B1 | 10/2013 | Lamego et al. |
| 8,571,619 B2 | 10/2013 | Al-Ali et al. |
| 8,577,431 B2 | 11/2013 | Lamego et al. |
| 8,584,345 B2 | 11/2013 | Al-Ali et al. |
| 8,588,880 B2 | 11/2013 | Abdul-Hafiz et al. |
| 8,630,691 B2 | 1/2014 | Lamego et al. |
| 8,641,631 B2 | 2/2014 | Sierra et al. |
| 8,652,060 B2 | 2/2014 | Al-Ali |
| 8,666,468 B1 | 3/2014 | Al-Ali |
| 8,670,811 B2 | 3/2014 | O'Reilly |
| RE44,823 E | 4/2014 | Parker |
| RE44,875 E | 4/2014 | Kiani et al. |
| 8,688,183 B2 | 4/2014 | Bruinsma et al. |
| 8,690,799 B2 | 4/2014 | Telfort et al. |
| 8,702,627 B2 | 4/2014 | Telfort et al. |
| 8,712,494 B1 | 4/2014 | MacNeish, III et al. |
| 8,715,206 B2 | 5/2014 | Telfort et al. |
| 8,723,677 B1 | 5/2014 | Kiani |
| 8,740,792 B1 | 6/2014 | Kiani et al. |
| 8,755,535 B2 | 6/2014 | Telfort et al. |
| 8,755,872 B1 | 6/2014 | Marinow |
| 8,764,671 B2 | 7/2014 | Kiani |
| 8,768,423 B2 | 7/2014 | Shakespeare et al. |
| 8,771,204 B2 | 7/2014 | Telfort et al. |
| 8,781,544 B2 | 7/2014 | Al-Ali et al. |
| 8,790,268 B2 | 7/2014 | Al-Ali |
| 8,801,613 B2 | 8/2014 | Al-Ali et al. |
| 8,821,397 B2 | 9/2014 | Al-Ali et al. |
| 8,821,415 B2 | 9/2014 | Al-Ali et al. |
| 8,830,449 B1 | 9/2014 | Lamego et al. |
| 8,840,549 B2 | 9/2014 | Al-Ali et al. |
| 8,852,094 B2 | 10/2014 | Al-Ali et al. |
| 8,852,994 B2 | 10/2014 | Wojtczuk et al. |
| 8,897,847 B2 | 11/2014 | Al-Ali |
| 8,911,377 B2 | 12/2014 | Al-Ali |
| 8,989,831 B2 | 3/2015 | Al-Ali et al. |
| 8,998,809 B2 | 4/2015 | Kiani |
| 9,066,666 B2 | 6/2015 | Kiani |
| 9,066,680 B1 | 6/2015 | Al-Ali et al. |
| 9,095,316 B2 | 8/2015 | Welch et al. |
| 9,106,038 B2 | 8/2015 | Telfort et al. |
| 9,107,625 B2 | 8/2015 | Telfort et al. |
| 9,131,881 B2 | 9/2015 | Diab et al. |
| 9,138,180 B1 | 9/2015 | Coverston et al. |
| 9,153,112 B1 | 10/2015 | Kiani et al. |
| 9,192,329 B2 | 11/2015 | Al-Ali |
| 9,192,351 B1 | 11/2015 | Telfort et al. |
| 9,195,385 B2 | 11/2015 | Al-Ali et al. |
| 9,211,095 B1 | 12/2015 | Al-Ali |
| 9,218,454 B2 | 12/2015 | Kiani et al. |
| 9,245,668 B1 | 1/2016 | Vo et al. |
| 9,267,572 B2 | 2/2016 | Barker et al. |
| 9,277,880 B2 | 3/2016 | Poeze et al. |
| 9,307,928 B1 | 4/2016 | Al-Ali et al. |
| 9,323,894 B2 | 4/2016 | Kiani |
| D755,392 S | 5/2016 | Hwang et al. |
| 9,326,712 B1 | 5/2016 | Kiani |
| 9,392,945 B2 | 7/2016 | Al-Ali et al. |
| 9,408,542 B1 | 8/2016 | Kinast et al. |
| 9,436,645 B2 | 9/2016 | Al-Ali et al. |
| 9,445,759 B1 | 9/2016 | Lamego et al. |
| 9,474,474 B2 | 10/2016 | Lamego et al. |
| 9,480,435 B2 | 11/2016 | Olsen |
| 9,510,779 B2 | 12/2016 | Poeze et al. |

(56) References Cited

U.S. PATENT DOCUMENTS

| | | |
|---|---|---|
| 9,517,024 B2 | 12/2016 | Kiani et al. |
| 9,532,722 B2 | 1/2017 | Lamego et al. |
| 9,560,996 B2 | 2/2017 | Kiani |
| 9,579,039 B2 | 2/2017 | Jansen et al. |
| 9,622,692 B2 | 4/2017 | Lamego et al. |
| D788,312 S | 5/2017 | Al-Ali et al. |
| 9,649,054 B2 | 5/2017 | Lamego et al. |
| 9,697,928 B2 | 7/2017 | Al-Ali et al. |
| 9,717,458 B2 | 8/2017 | Lamego et al. |
| 9,724,016 B1 | 8/2017 | Al-Ali et al. |
| 9,724,024 B2 | 8/2017 | Al-Ali |
| 9,724,025 B1 | 8/2017 | Kiani et al. |
| 9,749,232 B2 | 8/2017 | Sampath et al. |
| 9,750,442 B2 | 9/2017 | Olsen |
| 9,750,461 B1 | 9/2017 | Telfort |
| 9,775,545 B2 | 10/2017 | Al-Ali et al. |
| 9,778,079 B1 | 10/2017 | Al-Ali et al. |
| 9,782,077 B2 | 10/2017 | Lamego et al. |
| 9,787,568 B2 | 10/2017 | Lamego et al. |
| 9,808,188 B1 | 11/2017 | Perea et al. |
| 9,839,379 B2 | 12/2017 | Al-Ali et al. |
| 9,839,381 B1 | 12/2017 | Weber et al. |
| 9,847,749 B2 | 12/2017 | Kiani et al. |
| 9,848,800 B1 | 12/2017 | Lee et al. |
| 9,861,298 B2 | 1/2018 | Eckerbom et al. |
| 9,861,305 B1 | 1/2018 | Weber et al. |
| 9,877,650 B2 | 1/2018 | Muhsin et al. |
| 9,891,079 B2 | 2/2018 | Dalvi |
| 9,924,897 B1 | 3/2018 | Abdul-Hafiz |
| 9,936,917 B2 | 4/2018 | Poeze et al. |
| 9,955,937 B2 | 5/2018 | Telfort |
| 9,965,946 B2 | 5/2018 | Al-Ali et al. |
| D820,865 S | 6/2018 | Muhsin et al. |
| 9,986,952 B2 | 6/2018 | Dalvi et al. |
| D822,215 S | 7/2018 | Al-Ali et al. |
| D822,216 S | 7/2018 | Barker et al. |
| 10,010,276 B2 | 7/2018 | Al-Ali et al. |
| 10,086,138 B1 | 10/2018 | Novak, Jr. |
| 10,111,591 B2 | 10/2018 | Dyell et al. |
| D833,624 S | 11/2018 | DeJong et al. |
| 10,123,729 B2 | 11/2018 | Dyell et al. |
| D835,282 S | 12/2018 | Barker et al. |
| D835,283 S | 12/2018 | Barker et al. |
| D835,284 S | 12/2018 | Barker et al. |
| D835,285 S | 12/2018 | Barker et al. |
| 10,149,616 B2 | 12/2018 | Al-Ali et al. |
| 10,154,815 B2 | 12/2018 | Al-Ali et al. |
| 10,159,412 B2 | 12/2018 | Lamego et al. |
| 10,188,348 B2 | 1/2019 | Al-Ali et al. |
| RE47,218 E | 2/2019 | Al-Ali |
| RE47,244 E | 2/2019 | Kiani et al. |
| RE47,249 E | 2/2019 | Kiani et al. |
| 10,205,291 B2 | 2/2019 | Scruggs et al. |
| 10,226,187 B2 | 3/2019 | Al-Ali et al. |
| 10,231,657 B2 | 3/2019 | Al-Ali et al. |
| 10,231,670 B2 | 3/2019 | Blank et al. |
| RE47,353 E | 4/2019 | Kiani et al. |
| 10,279,247 B2 | 5/2019 | Kiani |
| 10,292,664 B2 | 5/2019 | Al-Ali |
| 10,299,720 B2 | 5/2019 | Brown et al. |
| 10,327,337 B2 | 6/2019 | Schmidt et al. |
| 10,327,713 B2 | 6/2019 | Barker et al. |
| 10,332,630 B2 | 6/2019 | Al-Ali |
| 10,383,520 B2 | 8/2019 | Wojtczuk et al. |
| 10,383,527 B2 | 8/2019 | Al-Ali |
| 10,388,120 B2 | 8/2019 | Muhsin et al. |
| D864,120 S | 10/2019 | Forrest et al. |
| 10,441,181 B1 | 10/2019 | Telfort et al. |
| 10,441,196 B2 | 10/2019 | Eckerbom et al. |
| 10,448,844 B2 | 10/2019 | Al-Ali et al. |
| 10,448,871 B2 | 10/2019 | Al-Ali et al. |
| 10,456,038 B2 | 10/2019 | Lamego et al. |
| 10,463,340 B2 | 11/2019 | Telfort et al. |
| 10,471,159 B1 | 11/2019 | Lapotko et al. |
| 10,505,311 B2 | 12/2019 | Al-Ali et al. |
| 10,524,738 B2 | 1/2020 | Olsen |
| 10,532,174 B2 | 1/2020 | Al-Ali |
| 10,537,285 B2 | 1/2020 | Shreim et al. |
| 10,542,903 B2 | 1/2020 | Al-Ali et al. |
| 10,555,678 B2 | 2/2020 | Dalvi et al. |
| 10,568,553 B2 | 2/2020 | O'Neil et al. |
| 10,608,817 B2 | 3/2020 | Haider et al. |
| D880,477 S | 4/2020 | Forrest et al. |
| 10,617,302 B2 | 4/2020 | Al-Ali et al. |
| 10,617,335 B2 | 4/2020 | Al-Ali et al. |
| 10,637,181 B2 | 4/2020 | Al-Ali et al. |
| D886,849 S | 6/2020 | Muhsin et al. |
| D887,548 S | 6/2020 | Abdul-Hafiz et al. |
| D887,549 S | 6/2020 | Abdul-Hafiz et al. |
| 10,667,764 B2 | 6/2020 | Ahmed et al. |
| D890,708 S | 7/2020 | Forrest et al. |
| 10,721,785 B2 | 7/2020 | Al-Ali |
| 10,736,518 B2 | 8/2020 | Al-Ali et al. |
| 10,750,984 B2 | 8/2020 | Pauley et al. |
| D897,098 S | 9/2020 | Al-Ali |
| 10,779,098 B2 | 9/2020 | Iswanto et al. |
| 10,827,961 B1 | 11/2020 | Iyengar et al. |
| 10,828,007 B1 | 11/2020 | Telfort et al. |
| 10,832,818 B2 | 11/2020 | Muhsin et al. |
| 10,849,554 B2 | 12/2020 | Shreim et al. |
| 10,856,750 B2 | 12/2020 | Indorf et al. |
| D906,970 S | 1/2021 | Forrest et al. |
| D908,213 S | 1/2021 | Abdul-Hafiz et al. |
| 10,918,281 B2 | 2/2021 | Al-Ali et al. |
| 10,932,705 B2 | 3/2021 | Muhsin et al. |
| 10,932,729 B2 | 3/2021 | Kiani et al. |
| 10,939,878 B2 | 3/2021 | Kiani et al. |
| 10,956,950 B2 | 3/2021 | Al-Ali et al. |
| D916,135 S | 4/2021 | Indorf et al. |
| D917,046 S | 4/2021 | Abdul-Hafiz et al. |
| D917,550 S | 4/2021 | Indorf et al. |
| D917,564 S | 4/2021 | Indorf et al. |
| D917,704 S | 4/2021 | Al-Ali et al. |
| 10,987,066 B2 | 4/2021 | Chandran et al. |
| 10,991,135 B2 | 4/2021 | Al-Ali et al. |
| D919,094 S | 5/2021 | Al-Ali et al. |
| D919,100 S | 5/2021 | Al-Ali et al. |
| 11,006,867 B2 | 5/2021 | Al-Ali |
| D921,202 S | 6/2021 | Al-Ali et al. |
| 11,024,064 B2 | 6/2021 | Muhsin et al. |
| 11,026,604 B2 | 6/2021 | Chen et al. |
| D925,597 S | 7/2021 | Chandran et al. |
| D927,699 S | 8/2021 | Al-Ali et al. |
| 11,076,777 B2 | 8/2021 | Lee et al. |
| 11,114,188 B2 | 9/2021 | Poeze et al. |
| D933,232 S | 10/2021 | Al-Ali et al. |
| D933,233 S | 10/2021 | Al-Ali et al. |
| D933,234 S | 10/2021 | Al-Ali et al. |
| 11,145,408 B2 | 10/2021 | Sampath et al. |
| 11,147,518 B1 | 10/2021 | Al-Ali et al. |
| 11,185,262 B2 | 11/2021 | Al-Ali et al. |
| 11,191,484 B2 | 12/2021 | Kiani et al. |
| D946,596 S | 3/2022 | Ahmed |
| D946,597 S | 3/2022 | Ahmed |
| D946,598 S | 3/2022 | Ahmed |
| D946,617 S | 3/2022 | Ahmed |
| 11,272,839 B2 | 3/2022 | Al-Ali et al. |
| 11,282,367 B1 * | 3/2022 | Aquino .............. G08B 21/0476 |
| 11,289,199 B2 | 3/2022 | Al-Ali |
| RE49,034 E | 4/2022 | Al-Ali |
| 11,298,021 B2 | 4/2022 | Muhsin et al. |
| D950,580 S | 5/2022 | Ahmed |
| D950,599 S | 5/2022 | Ahmed |
| D950,738 S | 5/2022 | Al-Ali et al. |
| D957,648 S | 7/2022 | Al-Ali |
| 11,382,567 B2 | 7/2022 | O'Brien et al. |
| 11,389,093 B2 | 7/2022 | Triman et al. |
| 11,406,286 B2 | 8/2022 | Al-Ali et al. |
| 11,417,426 B2 | 8/2022 | Muhsin et al. |
| 11,439,329 B2 | 9/2022 | Lamego |
| 11,445,948 B2 | 9/2022 | Scruggs et al. |
| D965,789 S | 10/2022 | Al-Ali et al. |
| D967,433 S | 10/2022 | Al-Ali et al. |
| 11,464,410 B2 | 10/2022 | Muhsin |

(56) References Cited

U.S. PATENT DOCUMENTS

| | | |
|---|---|---|
| 11,504,058 B1 | 11/2022 | Sharma et al. |
| 11,504,066 B1 | 11/2022 | Dalvi et al. |
| D971,933 S | 12/2022 | Ahmed |
| D973,072 S | 12/2022 | Ahmed |
| D973,685 S | 12/2022 | Ahmed |
| D973,686 S | 12/2022 | Ahmed |
| D974,193 S | 1/2023 | Forrest et al. |
| D979,516 S | 2/2023 | Al-Ali et al. |
| D980,091 S | 3/2023 | Forrest et al. |
| 11,596,363 B2 | 3/2023 | Lamego |
| 11,627,919 B2 | 4/2023 | Kiani et al. |
| 11,637,437 B2 | 4/2023 | Al-Ali et al. |
| D985,498 S | 5/2023 | Al-Ali et al. |
| 11,653,862 B2 | 5/2023 | Dalvi et al. |
| D989,112 S | 6/2023 | Muhsin et al. |
| D989,327 S | 6/2023 | Al-Ali et al. |
| 11,678,829 B2 | 6/2023 | Al-Ali et al. |
| 11,679,579 B2 | 6/2023 | Al-Ali |
| 11,684,296 B2 | 6/2023 | Vo et al. |
| 11,692,934 B2 | 7/2023 | Normand et al. |
| 11,701,043 B2 | 7/2023 | Al-Ali et al. |
| D997,365 S | 8/2023 | Hwang |
| 11,721,105 B2 | 8/2023 | Ranasinghe et al. |
| 11,730,379 B2 | 8/2023 | Ahmed et al. |
| D998,625 S | 9/2023 | Indorf et al. |
| D998,630 S | 9/2023 | Indorf et al. |
| D998,631 S | 9/2023 | Indorf et al. |
| D999,244 S | 9/2023 | Indorf et al. |
| D999,245 S | 9/2023 | Indorf et al. |
| D999,246 S | 9/2023 | Indorf et al. |
| 11,766,198 B2 | 9/2023 | Pauley et al. |
| D1,000,975 S | 10/2023 | Al-Ali et al. |
| 11,803,623 B2 | 10/2023 | Kiani et al. |
| 11,832,940 B2 | 12/2023 | Diab et al. |
| D1,013,179 S | 1/2024 | Al-Ali et al. |
| 11,872,156 B2 | 1/2024 | Telfort et al. |
| 11,879,960 B2 | 1/2024 | Ranasinghe et al. |
| 11,883,129 B2 | 1/2024 | Olsen |
| D1,022,729 S | 4/2024 | Forrest et al. |
| 11,951,186 B2 | 4/2024 | Krishnamani et al. |
| 11,974,833 B2 | 5/2024 | Forrest et al. |
| 11,986,067 B2 | 5/2024 | Al-Ali et al. |
| 11,986,289 B2 | 5/2024 | Dalvi et al. |
| 11,986,305 B2 | 5/2024 | Al-Ali et al. |
| 12,004,869 B2 | 6/2024 | Kiani et al. |
| 12,014,328 B2 | 6/2024 | Wachman et al. |
| D1,036,293 S | 7/2024 | Al-Ali et al. |
| D1,037,462 S | 7/2024 | Al-Ali et al. |
| 12,029,844 B2 | 7/2024 | Pauley et al. |
| 12,048,534 B2 | 7/2024 | Vo et al. |
| 12,064,217 B2 | 8/2024 | Ahmed et al. |
| D1,041,511 S | 9/2024 | Indorf et al. |
| 12,076,159 B2 | 9/2024 | Belur Nagaraj et al. |
| D1,044,828 S | 10/2024 | Chandran et al. |
| 2001/0034477 A1 | 10/2001 | Mansfield et al. |
| 2001/0039483 A1 | 11/2001 | Brand et al. |
| 2002/0010401 A1 | 1/2002 | Bushmakin et al. |
| 2002/0058864 A1 | 5/2002 | Mansfield et al. |
| 2002/0133080 A1 | 9/2002 | Apruzzese et al. |
| 2003/0013975 A1 | 1/2003 | Kiani |
| 2003/0018243 A1 | 1/2003 | Gerhardt et al. |
| 2003/0144582 A1 | 7/2003 | Cohen et al. |
| 2003/0156288 A1 | 8/2003 | Barnum et al. |
| 2003/0212312 A1 | 11/2003 | Coffin, IV et al. |
| 2004/0106163 A1 | 6/2004 | Workman, Jr. et al. |
| 2005/0055276 A1 | 3/2005 | Kiani et al. |
| 2005/0234317 A1 | 10/2005 | Kiani |
| 2006/0073719 A1 | 4/2006 | Kiani |
| 2006/0189871 A1 | 8/2006 | Al-Ali et al. |
| 2007/0073116 A1 | 3/2007 | Kiani et al. |
| 2007/0180140 A1 | 8/2007 | Welch et al. |
| 2007/0244377 A1 | 10/2007 | Cozad et al. |
| 2008/0064965 A1 | 3/2008 | Jay et al. |
| 2008/0094228 A1 | 4/2008 | Welch et al. |
| 2008/0103375 A1 | 5/2008 | Kiani |
| 2008/0221418 A1 | 9/2008 | Al-Ali et al. |
| 2009/0036759 A1 | 2/2009 | Ault et al. |
| 2009/0093687 A1 | 4/2009 | Telfort et al. |
| 2009/0095926 A1 | 4/2009 | MacNeish, III |
| 2009/0247984 A1 | 10/2009 | Lamego et al. |
| 2009/0275844 A1 | 11/2009 | Al-Ali |
| 2010/0004518 A1 | 1/2010 | Vo et al. |
| 2010/0030040 A1 | 2/2010 | Poeze et al. |
| 2010/0099964 A1 | 4/2010 | O'Reilly et al. |
| 2010/0234718 A1 | 9/2010 | Sampath et al. |
| 2010/0270257 A1 | 10/2010 | Wachman et al. |
| 2011/0028806 A1 | 2/2011 | Merritt et al. |
| 2011/0028809 A1 | 2/2011 | Goodman |
| 2011/0040197 A1 | 2/2011 | Welch et al. |
| 2011/0082711 A1 | 4/2011 | Poeze et al. |
| 2011/0087081 A1 | 4/2011 | Kiani et al. |
| 2011/0118561 A1 | 5/2011 | Tari et al. |
| 2011/0137297 A1 | 6/2011 | Kiani et al. |
| 2011/0172498 A1 | 7/2011 | Olsen et al. |
| 2012/0123231 A1 | 5/2012 | O'Reilly |
| 2012/0165629 A1 | 6/2012 | Merritt et al. |
| 2012/0209084 A1 | 8/2012 | Olsen et al. |
| 2012/0226117 A1 | 9/2012 | Lamego et al. |
| 2012/0283524 A1 | 11/2012 | Kiani et al. |
| 2013/0023775 A1 | 1/2013 | Lamego et al. |
| 2013/0060147 A1 | 3/2013 | Welch et al. |
| 2013/0096405 A1 | 4/2013 | Garfio |
| 2013/0296672 A1 | 11/2013 | O'Neil et al. |
| 2013/0345921 A1 | 12/2013 | Al-Ali et al. |
| 2014/0166076 A1 | 6/2014 | Kiani et al. |
| 2014/0180160 A1 | 6/2014 | Brown et al. |
| 2014/0187973 A1 | 7/2014 | Brown et al. |
| 2014/0275871 A1 | 9/2014 | Lamego et al. |
| 2014/0275872 A1 | 9/2014 | Merritt et al. |
| 2014/0316217 A1 | 10/2014 | Purdon et al. |
| 2014/0316218 A1 | 10/2014 | Purdon et al. |
| 2014/0323897 A1 | 10/2014 | Brown et al. |
| 2014/0323898 A1 | 10/2014 | Purdon et al. |
| 2015/0005600 A1 | 1/2015 | Blank et al. |
| 2015/0011907 A1 | 1/2015 | Purdon et al. |
| 2015/0073241 A1 | 3/2015 | Lamego |
| 2015/0080754 A1 | 3/2015 | Purdon et al. |
| 2015/0099950 A1 | 4/2015 | Al-Ali et al. |
| 2017/0005958 A1* | 1/2017 | Frenkel ............... G01S 5/0242 |
| 2017/0024748 A1 | 1/2017 | Haider |
| 2017/0173632 A1 | 6/2017 | Al-Ali |
| 2017/0251974 A1 | 9/2017 | Shreim et al. |
| 2018/0242926 A1 | 8/2018 | Muhsin et al. |
| 2018/0247712 A1 | 8/2018 | Muhsin et al. |
| 2019/0239787 A1 | 8/2019 | Pauley et al. |
| 2019/0320906 A1 | 10/2019 | Olsen |
| 2020/0060869 A1 | 2/2020 | Telfort et al. |
| 2020/0111552 A1 | 4/2020 | Ahmed |
| 2020/0113520 A1 | 4/2020 | Abdul-Hafiz et al. |
| 2020/0138368 A1 | 5/2020 | Kiani et al. |
| 2020/0163597 A1 | 5/2020 | Dalvi et al. |
| 2020/0196877 A1 | 6/2020 | Vo et al. |
| 2020/0253474 A1 | 8/2020 | Muhsin et al. |
| 2020/0253544 A1 | 8/2020 | Belur Nagaraj et al. |
| 2020/0275841 A1 | 9/2020 | Telfort et al. |
| 2020/0288983 A1 | 9/2020 | Telfort et al. |
| 2020/0329983 A1 | 10/2020 | Al-Ali et al. |
| 2020/0329984 A1 | 10/2020 | Al-Ali et al. |
| 2020/0329993 A1 | 10/2020 | Al-Ali et al. |
| 2021/0022628 A1 | 1/2021 | Telfort et al. |
| 2021/0104173 A1 | 4/2021 | Pauley et al. |
| 2021/0113121 A1 | 4/2021 | Diab et al. |
| 2021/0117525 A1 | 4/2021 | Kiani et al. |
| 2021/0118581 A1 | 4/2021 | Kiani et al. |
| 2021/0121582 A1 | 4/2021 | Krishnamani et al. |
| 2021/0161465 A1 | 6/2021 | Barker et al. |
| 2021/0236729 A1 | 8/2021 | Kiani et al. |
| 2021/0256267 A1 | 8/2021 | Ranasinghe et al. |
| 2021/0256835 A1 | 8/2021 | Ranasinghe et al. |
| 2021/0275101 A1 | 9/2021 | Vo et al. |
| 2021/0290060 A1 | 9/2021 | Ahmed |
| 2021/0290072 A1 | 9/2021 | Forrest |
| 2021/0290080 A1 | 9/2021 | Ahmed |
| 2021/0290120 A1 | 9/2021 | Al-Ali |

(56) References Cited

U.S. PATENT DOCUMENTS

| | | |
|---|---|---|
| 2021/0290177 A1 | 9/2021 | Novak, Jr. |
| 2021/0290184 A1 | 9/2021 | Ahmed |
| 2021/0296008 A1 | 9/2021 | Novak, Jr. |
| 2021/0330228 A1 | 10/2021 | Olsen et al. |
| 2021/0386382 A1 | 12/2021 | Olsen et al. |
| 2021/0402110 A1 | 12/2021 | Pauley et al. |
| 2022/0039707 A1 | 2/2022 | Sharma et al. |
| 2022/0053892 A1 | 2/2022 | Al-Ali et al. |
| 2022/0071562 A1 | 3/2022 | Kiani |
| 2022/0096603 A1 | 3/2022 | Kiani et al. |
| 2022/0151521 A1 | 5/2022 | Krishnamani et al. |
| 2022/0218244 A1 | 7/2022 | Kiani et al. |
| 2022/0287574 A1 | 9/2022 | Telfort et al. |
| 2022/0296161 A1 | 9/2022 | Al-Ali et al. |
| 2022/0361819 A1 | 11/2022 | Al-Ali et al. |
| 2022/0379059 A1 | 12/2022 | Yu et al. |
| 2022/0392610 A1 | 12/2022 | Kiani et al. |
| 2022/0417986 A1* | 12/2022 | Barash ............... H04W 74/0816 |
| 2023/0028745 A1 | 1/2023 | Al-Ali |
| 2023/0038389 A1 | 2/2023 | Vo |
| 2023/0045647 A1 | 2/2023 | Vo |
| 2023/0058052 A1 | 2/2023 | Al-Ali |
| 2023/0058342 A1 | 2/2023 | Kiani |
| 2023/0069789 A1 | 3/2023 | Koo et al. |
| 2023/0087671 A1 | 3/2023 | Telfort et al. |
| 2023/0110152 A1 | 4/2023 | Forrest et al. |
| 2023/0111198 A1 | 4/2023 | Yu et al. |
| 2023/0115397 A1 | 4/2023 | Vo et al. |
| 2023/0116371 A1 | 4/2023 | Mills et al. |
| 2023/0135297 A1 | 5/2023 | Kiani et al. |
| 2023/0138098 A1 | 5/2023 | Telfort et al. |
| 2023/0145155 A1 | 5/2023 | Krishnamani et al. |
| 2023/0147750 A1 | 5/2023 | Barker et al. |
| 2023/0210417 A1 | 7/2023 | Al-Ali et al. |
| 2023/0222805 A1 | 7/2023 | Muhsin et al. |
| 2023/0226331 A1 | 7/2023 | Kiani et al. |
| 2023/0284916 A1 | 9/2023 | Telfort |
| 2023/0284943 A1 | 9/2023 | Scruggs et al. |
| 2023/0301562 A1 | 9/2023 | Scruggs et al. |
| 2023/0346993 A1 | 11/2023 | Kiani et al. |
| 2023/0368221 A1 | 11/2023 | Haider |
| 2023/0371893 A1 | 11/2023 | Al-Ali et al. |
| 2023/0389837 A1 | 12/2023 | Krishnamani et al. |
| 2024/0016418 A1 | 1/2024 | Devadoss et al. |
| 2024/0016419 A1 | 1/2024 | Devadoss et al. |
| 2024/0047061 A1 | 2/2024 | Al-Ali et al. |
| 2024/0049310 A1 | 2/2024 | Al-Ali et al. |
| 2024/0049986 A1 | 2/2024 | Al-Ali et al. |
| 2024/0081656 A1 | 3/2024 | DeJong et al. |
| 2024/0122486 A1 | 4/2024 | Kiani |
| 2024/0180456 A1 | 6/2024 | Al-Ali |
| 2024/0188872 A1 | 6/2024 | Al-Ali et al. |
| 2024/0245855 A1 | 7/2024 | Vo et al. |
| 2024/0260894 A1 | 8/2024 | Olsen |
| 2024/0267698 A1 | 8/2024 | Telfort et al. |
| 2024/0277233 A1 | 8/2024 | Al-Ali |
| 2024/0277280 A1 | 8/2024 | Ai-Ali |
| 2024/0298920 A1 | 9/2024 | Fernkbist et al. |

* cited by examiner

MACHINE LEARNING BASED MONITORING SYSTEM

INCORPORATION BY REFERENCE TO ANY PRIORITY APPLICATIONS

The present application claims benefit of U.S. Provisional Application No. 63/298,569 entitled "Intelligent Camera System" filed Jan. 11, 2022 and U.S. Provisional Application No. 63/299,168 entitled "Intelligent Camera System" filed Jan. 13, 2022, the entirety of each of which is hereby incorporated by reference. Any and all applications for which a foreign or domestic priority claim is identified in the Application Data Sheet as filed with the present application are hereby incorporated by reference under 37 CFR 1.57.

BACKGROUND

A smart camera system can be a machine vision system which, in addition to image capture capabilities, is capable of extracting information from captured images. Some smart camera systems are capable of generating event descriptions and/or making decisions that are used in an automated system. Some camera systems can be a self-contained, standalone vision system with a built-in image sensor. The vision system and the image sensor can be integrated into a single hardware device. Some camera systems can include communication interfaces, such as, but not limited to Ethernet and/or wireless interfaces.

Safety can be important in clinical, hospice, assisted living, and/or home settings. Potentially dangerous events can happen in these environments. Automation can also be beneficial in these environments.

SUMMARY

The systems, methods, and devices described herein each have several aspects, no single one of which is solely responsible for its desirable attributes. Without limiting the scope of this disclosure, several non-limiting features will now be discussed briefly.

According to an aspect, a system is disclosed comprising: a storage device configured to store first instructions and second instructions; a camera; a hardware accelerator configured to execute the first instructions; and a hardware processor configured to execute the second instructions to: receive, from the camera, first image data; invoke, on the hardware accelerator, a person detection model based on the first image data, wherein the person detection model outputs first classification result; detect a person based on the first classification result; receive, from the camera, second image data; and in response to detecting the person, invoke, on the hardware accelerator, a fall detection model based on the second image data, wherein the fall detection model outputs a second classification result, detect a potential fall based on the second classification result, and in response to detecting the potential fall, provide an alert.

According to an aspect, the system may further comprise a microphone, wherein the hardware processor may be configured to execute further instructions to: receive, from the microphone, audio data; and in response to detecting the person, invoke, on the hardware accelerator, a loud noise detection model based on the audio data, wherein the loud noise detection model outputs a third classification result, and detect a potential scream based on the third classification result.

According to an aspect, the hardware processor may be configured to execute additional instructions to: in response to detecting the potential scream, provide a second alert.

According to an aspect, the hardware processor may be configured to execute additional instructions to: in response to detecting the potential fall and the potential scream, provide an escalated alert.

According to an aspect, invoking the loud noise detection model based on the audio data may further comprise: generating spectrogram data from the audio data; and providing the spectrogram data as input to the loud noise detection model.

According to an aspect, the second image data may comprise a plurality of images.

According to an aspect, a method is disclosed comprising: receiving, from a camera, first image data; invoking, on a hardware accelerator, a person detection model based on the first image data, wherein the person detection model outputs first classification result; detecting a person based on the first classification result; receiving, from the camera, second image data; and in response to detecting the person, invoking, on the hardware accelerator, a plurality of person safety models based on the second image data, for each person safety model from the plurality of person safety models, receiving, from the hardware accelerator, a second classification result, detecting a potential safety issue based on a particular second classification result, and in response to detecting the potential safety issue, providing an alert.

According to an aspect, the method may further comprise: in response to detecting the person, invoking, on the hardware accelerator, a facial feature extraction model based on the second image data, wherein the facial feature extraction model outputs a facial feature vector, executing a query of a facial features database based on the facial feature vector, wherein executing the query indicates that the facial feature vector is not present in the facial features database, and in response to determining that the facial feature vector is not present in the facial features database, providing an unrecognized person alert.

According to an aspect, the plurality of person safety models may comprise a fall detection model, the method may further comprise: collecting a first set of videos of person falls; collecting a second set of videos of persons without falling; creating a training data set comprising the first set of videos and the second set of videos; and training the fall detection model using the training data set.

According to an aspect, the plurality of person safety models may comprise a handwashing detection model, the method may further comprise: collecting a first set of videos of with handwashing; collecting a second set of videos without handwashing; creating a training data set comprising the first set of videos and the second set of videos; and training the handwashing detection model using the training data set.

According to an aspect, the method may further comprise: receiving, from a microphone, audio data; and in response to detecting the person, invoking, on the hardware accelerator, a loud noise detection model based on the audio data, wherein the loud noise detection model outputs a third classification result, and detecting a potential scream based on the third classification result.

According to an aspect, the method may further comprise: in response to detecting the potential safety issue and the potential scream, providing an escalated alert.

According to an aspect, the method may further comprise: collecting a first set of videos of with screaming; collecting a second set of videos without screaming; creating a training data set comprising the first set of videos and the second set of videos; and training the loud noise detection model using the training data set.

According to an aspect, a system is disclosed comprising: a storage device configured to store first instructions and second instructions; a camera; a hardware accelerator configured to execute the first instructions; and a hardware processor configured to execute the second instructions to: receive, from the camera, first image data; invoke, on the hardware accelerator, a person detection model based on the first image data, wherein the person detection model outputs first classification result; detect a person based on the first classification result; receive, from the camera, second image data; and in response to detecting the person, invoke, on the hardware accelerator, a plurality of person safety models based on the second image data, for each person safety model from the plurality of person safety models, receive, from the hardware accelerator, a model result, detect a potential safety issue based on a particular model result, and in response to detecting the potential safety issue, provide an alert.

According to an aspect, the plurality of person safety models may comprise a fall detection model, and wherein invoking the plurality of person safety models may comprise: invoking, on the hardware accelerator, the fall detection model based on the second image data, wherein the fall detection model outputs the particular model result.

According to an aspect, the plurality of person safety models may comprise a handwashing detection model, and wherein invoking the plurality of person safety models may comprise: invoking, on the hardware accelerator, the handwashing detection model based on the second image data, wherein the handwashing detection model outputs the particular model result.

According to an aspect, the system may further comprise a microphone, wherein the hardware processor may be configured to execute further instructions to: receive, from the microphone, audio data; and in response to detecting the person, invoke, on the hardware accelerator, a loud noise detection model based on the audio data, wherein the loud noise detection model outputs a third classification result, detect a potential loud noise based on the third classification result, and in response to detecting the potential loud noise, provide a second alert.

According to an aspect, the system may further comprise a display, wherein the hardware processor may be configured to execute further instructions to: cause presentation, on the display, of a prompt to cause a person to perform an activity; receive, from the camera, third image data of a recording of the activity; invoke, on the hardware accelerator, a screening machine learning model based on the third image data, wherein the screening machine learning model outputs a third classification result, detect a potential screening issue based on the third classification result, and in response to detecting the potential screening issue, provide a second alert.

According to an aspect, the screening machine learning model may be a pupillometry screening model, and wherein the potential screening issue indicates potential dilated pupils.

According to an aspect, the screening machine learning model may be a facial paralysis screening model, and wherein the potential screening issue indicates potential facial paralysis.

According to an aspect, a system is disclosed comprising: a storage device configured to store first instructions and second instructions; a wearable device configured to process sensor signals to determine a physiological value for a person; a microphone; a camera; a hardware accelerator configured to execute the first instructions; and a hardware processor configured to execute the second instructions to: receive, from the wearable device, the first physiological value; determine to begin a monitoring process based on the first physiological value; and in response to determining to begin the monitoring process, receive, from the camera, image data; receive, from the microphone, audio data; invoke, on the hardware accelerator, a first unconscious detection model based on the image data, wherein the first unconscious detection model outputs a first classification result, invoke, on the hardware accelerator, a second unconscious detection model based on the audio data, wherein the second unconscious detection model outputs a second classification result, detect a potential state of unconsciousness based on the first classification result and the second classification result, and in response to detecting the potential state of unconsciousness, provide an alert.

According to an aspect, the wearable device may comprise a pulse oximetry sensor and the first physiological value is for blood oxygen saturation, and wherein determining to begin the monitoring process based on the first physiological value further comprises: determining that the first physiological value is below a threshold level.

According to an aspect, the wearable device may comprise a respiration rate sensor and the first physiological value is for respiration rate, and wherein determining to begin the monitoring process based on the first physiological value further comprises: determining that the first physiological value satisfies a threshold alarm level.

According to an aspect, the wearable device comprises a heart rate sensor and the first physiological value is for heart rate, and wherein determining to begin the monitoring process based on the physiological value further comprises: receiving, from the wearable device, a plurality of physiological values measuring heart rate over time; and determining that the plurality of physiological values and the first physiological value satisfies a threshold alarm level.

According to an aspect, a system is disclosed comprising: a storage device configured to store instructions; a display; a camera; and a hardware processor configured to execute the instructions to: receive a current time; determine to begin a check-up process from the current time; and in response to determining to begin the check-up process, cause presentation, on the display, of a prompt to cause a person to perform a check-up activity, receive, from the camera, image data of a recording of the check-up activity, invoke a screening machine learning model based on the image data, wherein the screening machine learning model outputs a classification result, detect a potential screening issue based on the classification result, and in response to detecting the potential screening issue, provide an alert.

According to an aspect, the screening machine learning model may be a pupillometry screening model, and wherein the potential screening issue indicates potential dilated pupils.

According to an aspect, the screening machine learning model may be a facial paralysis screening model, and wherein the potential screening issue indicates potential facial paralysis.

According to an aspect, the system may further comprise a wearable device configured to process sensor signals to determine a physiological value for the person, wherein the hardware processor may be configured to execute further instructions to: receive, from the wearable device, the physiological value; and generate the alert comprising the physiological value.

According to an aspect, the wearable device may comprise a pulse oximetry sensor and the physiological value is for blood oxygen saturation.

According to an aspect, the wearable device may be further configured to process the sensor signals to measure at least one of blood oxygen saturation, pulse rate, perfusion index, respiration rate, heart rate, or pleth variability index.

According to an aspect, the hardware processor may be configured to execute further instructions to: receive, from a second computing device, first video data; cause presentation, on the display, of the first video data; receive, from the camera, second video data; and transmit, to the second computing device, the second video data.

According to an aspect, a method is disclosed comprising: receiving a current time; determining to begin a check-up process from the current time; and in response to determining to begin the check-up process, causing presentation, on a display, of a prompt to cause a person to perform a check-up activity, receiving, from a camera, image data of a recording of the check-up activity, invoking a screening machine learning model based on the image data, wherein the screening machine learning model outputs a model result, detecting a potential screening issue based on the model result, and in response to detecting the potential screening issue, providing an alert.

According to an aspect, the screening machine learning model may be a pupillometry screening model, and wherein the potential screening issue indicates potential dilated pupils, the method further comprise: collecting a first set of images of dilated pupils; collecting a second set of images without dilated pupils; creating a training data set comprising the first set of images and the second set of images; and training the pupillometry screening model using the training data set.

According to an aspect, the screening machine learning model may be a facial paralysis screening model, and wherein the potential screening issue indicates potential facial paralysis, the method may further comprise: collecting a first set of images of facial paralysis; collecting a second set of images without facial paralysis; creating a training data set comprising the first set of images and the second set of images; and training the facial paralysis screening model using the training data set.

According to an aspect, the check-up activity may comprise a dementia test, and wherein the screening machine learning model may comprise a gesture detection model.

According to an aspect, the gesture detection model may be configured to detect a gesture directed towards a portion of the display.

According to an aspect, the method may further comprise: receiving, from the camera, second image data; invoking a person detection model based on the second image data, wherein the person detection model outputs first classification result; detect a person based on the first classification result; receive, from the camera, third image data; and in response to detecting the person, invoking a handwashing detection model based on the third image data, wherein the handwashing detection model outputs a second classification result, detecting a potential lack of handwashing based on the second classification result, and in response to detecting a lack of handwashing, provide a second alert.

According to an aspect, a system is disclosed comprising: a storage device configured to store instructions; a camera; and a hardware processor configured to execute the instructions to: receive, from the camera, first image data; invoke an infant detection model based on the first image data, wherein the infant detection model outputs a classification result; detect an infant based on the classification result; receive captured data; and in response to detecting the infant, invoke an infant safety model based on the captured data, wherein the infant safety model outputs a model result, detect a potential safety issue based on the model result, and in response to detecting the potential safety issue, provide an alert.

According to an aspect, the infant safety model may be an infant position model, and wherein the potential safety issue indicates the infant potentially laying on their stomach.

According to an aspect, the hardware processor may be configured to execute further instructions to: receive, from the camera, second image data; and in response to detecting the infant, invoke a facial feature extraction model based on the second image data, wherein the facial feature extraction model outputs a facial feature vector, execute a query of a facial features database based on the facial feature vector, wherein executing the query indicates that the facial feature vector is not present in the facial features database, and in response to determining that the facial feature vector is not present in the facial features database, provide an unrecognized person alert.

According to an aspect, the infant safety model may be an infant color detection model, and wherein the potential safety issue indicates potential asphyxiation.

According to an aspect, the model result may comprise coordinates of a boundary region identifying an infant object in the captured data, and wherein detecting the potential safety issue may comprise: determining that the coordinates of the boundary region exceed a threshold distance from an infant zone.

According to an aspect, the system may further comprise a wearable device configured to process sensor signals to determine a physiological value for the infant, wherein the hardware processor may be configured to execute further instructions to: receive, from the wearable device, the physiological value; and generate the alert comprising the physiological value.

According to an aspect, the system may further comprise a microphone, wherein the captured data is received from the microphone, wherein the infant safety model is a loud noise detection model, and wherein the potential safety issue indicates a potential scream.

In various aspects, systems and/or computer systems are disclosed that comprise a computer readable storage medium having program instructions embodied therewith, and one or more processors configured to execute the program instructions to cause the one or more processors to perform operations comprising one or more of the above- and/or below-aspects (including one or more aspects of the appended claims).

In various aspects, computer-implemented methods are disclosed in which, by one or more processors executing program instructions, one or more of the above- and/or below-described aspects (including one or more aspects of the appended claims) are implemented and/or performed.

BRIEF DESCRIPTION OF THE DRAWINGS

These and other features, aspects, and advantages are described below with reference to the drawings, which are intended for illustrative purposes and should in no way be interpreted as limiting. Furthermore, the various features described herein can be combined to form new combinations, which are part of this disclosure. In the drawings, like reference characters can denote corresponding features. The following is a brief description of each of the drawings.

DETAILED DESCRIPTION

As described above, some camera systems are capable of extracting information from captured images. However, extracting information from images and/or monitoring by existing camera systems can be limited. Technical improvements regarding monitoring people and/or objects and automated actions based on the monitoring can advantageously be helpful, improve safety, and possibly save lives.

Generally described, aspects of the present disclosure are directed to improved monitoring systems. In some aspects, a camera system can include a camera and a hardware accelerator. The camera system can include multiple machine learning models. Each model of the machine learning models can be configured to detect an object and/or an activity. The hardware accelerator can be special hardware that is configured to accelerate machine learning applications. The camera system can be configured to execute the machine learning models on the hardware accelerator. The camera system can advantageously be configured to execute conditional logic to determine which machine learning models should be applied and when. For example, until a person is detected in an area, the camera system may not apply any machine learning models related to persons, such as, but not limited to, fall detection, person identification, stroke detection, medication tracking, activity tracking, etc.

Some existing monitoring systems can have limited artificial intelligence capabilities. For example, some existing monitoring systems may only have basic person, object, or vehicle detection. Moreover, some existing monitoring systems may require a network connection from local cameras to backend servers that perform the artificial intelligence processing. Some existing cameras may have limited or no artificial intelligence capabilities. Performing artificial intelligence processing locally on cameras can be technically challenging. For example, the hardware processors and/or memory devices in existing cameras may be so limited as being unable to execute machine learning models locally. Moreover, existing cameras may have limited software to be able to execute machine learning models locally in an efficient manner. The systems and methods described herein may efficiently process camera data either locally and/or in a distributed manner with machine learning models. Accordingly, the systems and methods described herein may improve over existing artificial intelligence monitoring technology.

As used herein, "camera" and "camera system" can be used interchangeably. Moreover, as used herein, "camera" and "camera system" can be used interchangeably with "monitoring system" since a camera system can encompass a monitoring system in some aspects.

Figure 1A:
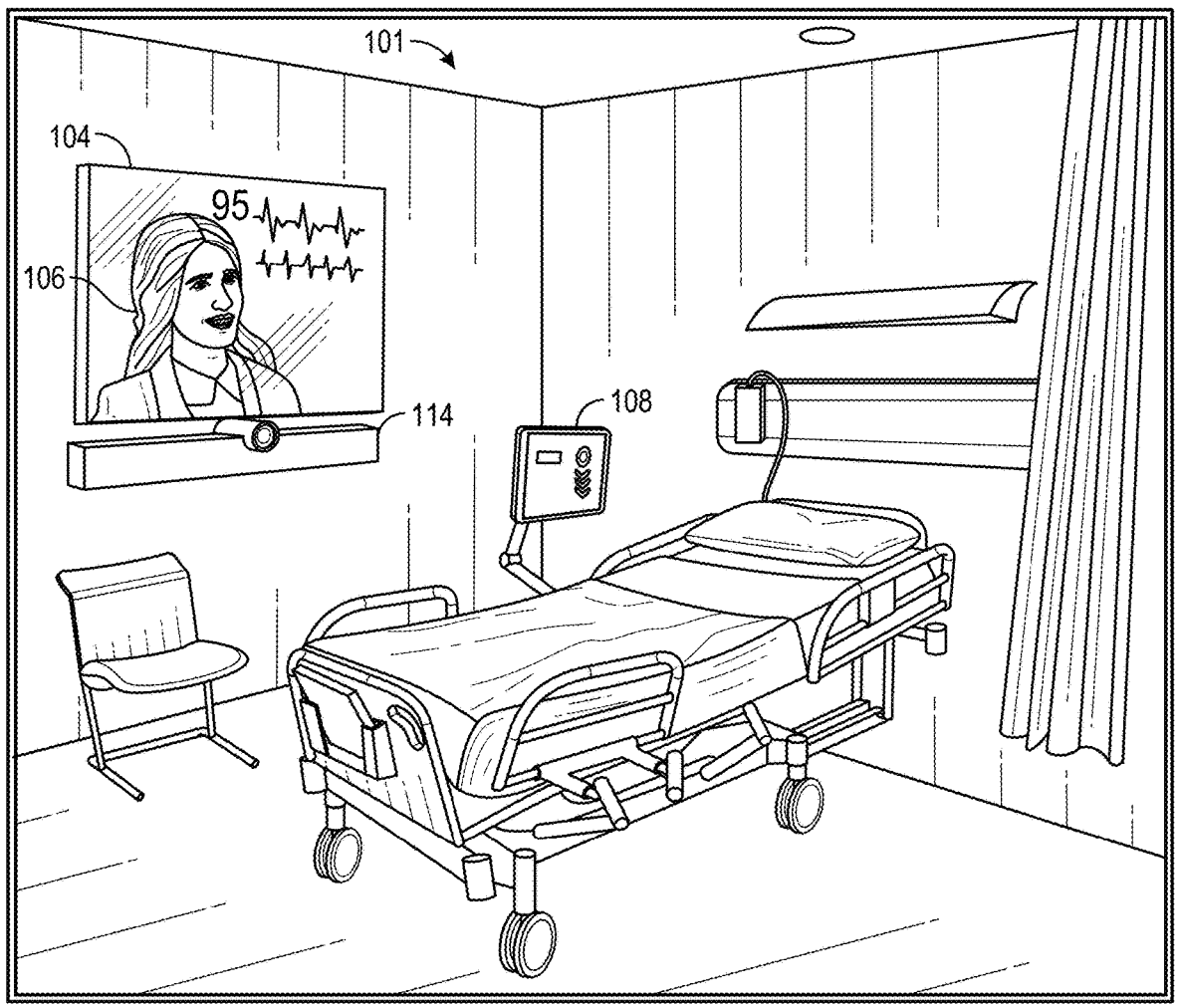
FIG. 1A is a drawing of a camera system in a clinical setting.

FIG. 1A depicts a camera system 114 in a clinical setting 101. The clinical setting 101 can be, but is not limited to, a hospital, nursing home, or hospice. The clinical setting 101 can include the camera system 114, a display 104, and a user computing device 108. In some aspects, the camera system 114 can be housed in a soundbar enclosure or a tabletop speaker enclosure (not illustrated). The camera system 114 can include multiple cameras (such as 1080p or 4k camera and/or an infrared image camera), an output speaker, an input microphone (such as a microphone array), an infrared blaster, and/or multiple hardware processors (including one or more hardware accelerators). In some aspects, the camera system 114 can have optical zoom. In some aspects, the camera system 114 can include a privacy switch that allows the monitoring system's 100A, 100B cameras to be closed. The camera system 114 may receive voice commands. The camera system 114 can include one or more hardware components for Bluetooth®, Bluetooth Low Energy (BLE), Ethernet, Wi-Fi, cellular (such as 4G/5G/LTE), near-field communication (NFC), radio-frequency identification (RFID), High-Definition Multimedia Interface (HDMI), and/or HDMI Consumer Electronics Control (CEC). The camera system 114 can be connected to the display 104 (such as a television) and the camera system 114 can control the display 104. In some aspects, the camera system 114 can be wirelessly connected to the user computing device 108 (such as a tablet). In particular, the camera system 114 can be wirelessly connected to a hub device and the hub device can be wirelessly connected to the user computing device 108.

The camera system 114 may include machine learning capabilities. The camera system 114 can include machine learning models. The machine learning models can include, but are not limited to, convolutional neural network (CNN) models and other models. A CNN model can be trained to extract features from images for object identification (such as person identification). In some aspects, a CNN can feed the extracted features to a recurrent neural network (RNN) for further processing. The camera system 114 may track movements of individuals inside the room without using any facial recognition or identification tag tracking. Identification tags can include, but are not limited to, badges and/or RFID tags. This feature allows the camera system 114 to track an individual's movements even when the identification of the individual is unknown. A person in the room may not be identifiable for various reasons. For example, the person may be wearing a mask so that facial recognition modules may not be able to extract any features. As another example, the person may be a visitor who is not issued an identification tag, unlike the clinicians, who typically wear identification tags. Alternatively, when the person is not wearing a mask and/or is wearing an identification tag, the camera system 114 may combine the motion tracking with the identification of the individual to further improve accuracy in tracking the activity of the individual in the room.

Having the identity of at least one person in the room may also improve accuracy in tracking the activity of other individuals in the room whose identity is unknown by reducing the number of anonymous individuals in the room. Additional details regarding machine learning capabilities and models that the camera system 114 can use are provided herein.

The camera system 114 can be included in a monitoring system, as described herein. The monitoring system can include remote interaction capabilities. A patient in the clinical setting 101 can be in isolation due to an illness, such as COVID-19. The patient can ask for assistance via a button (such as by selecting an element in the graphical user interface on the user computing device 108) and/or by issuing a voice command. In some aspects, the camera system 114 can be configured to respond to voice commands, such as, but not limited to, activating or deactivating cameras or other functions. In response to the request, a remote clinician 106 can interact with the patient via the display 104 and the camera system 114, which can include an input microphone and an output speaker. The monitoring system can also allow the patient to remotely maintain contact with friends and family via the display 104 and camera system 114. In some aspects, the camera system 114 can be connected to internet of things (IOT) devices. In some aspects, closing of the privacy switch can cause the camera system 114 and/or a monitoring system to disable monitoring. In other aspects, the monitoring system can still issue alerts if the privacy switch has been closed. In some aspects, the camera system 114 can record activity via cameras based on a trigger, such as, but not limited to, detection of motion via a motion sensor.

Figure 1B:
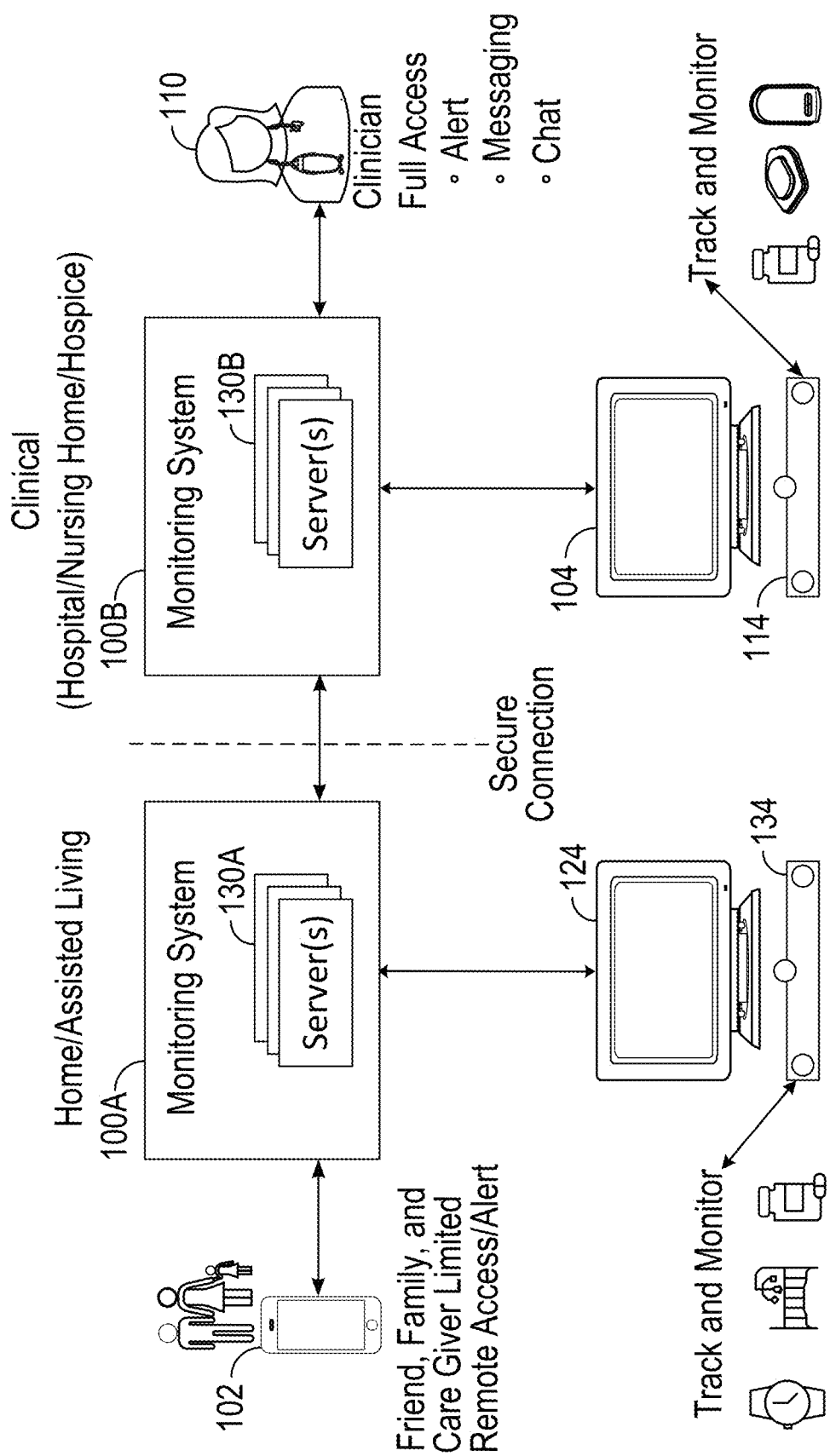
FIG. 1B is a schematic diagram illustrating a monitoring system.

FIG. 1B is a diagram depicting a monitoring system 100A, 100B. In some aspects, there can be a home/assisted living side to the monitoring system 100A and a clinical side to the monitoring system 100B. As described herein, the clinical side monitoring system 100B can track and monitor a patient via a first camera system 114 in a clinical setting. As described herein, the patient can be monitored via wearable sensor devices. A clinician 110 can interact with the patient via the first display 104 and the first camera system 114. Friends and family can also use a user computing device 102 to interact with the patient via the first display 104 and the first camera system 114.

The home/assisted living side monitoring system 100A can track and monitor a person (which can be an infant) via a second camera system 134 in a home/assisted living setting. For example, a person can be recovering at home or live in an assisted living home. As described herein, the person can be monitored via wearable sensor devices. A clinician 110 can interact with the person via the second display 124 and the second camera system 134. As shown, the clinical side to the monitoring system 100B can securely communicate with the home/assisted living side to the monitoring system 100A, which can allow communications between the clinician 110 and persons in the home or assisted living home. Friends and family can use the user computing device 102 to interact with the patient via the second display 124 and the second camera system 134.

In some aspects, the monitoring system 100A, 100B can include server(s) 130A, 130B. The server(s) 130A, 130B can facilitate communication between the clinician 110 and a person via the second display 124 and the second camera system 134. The server(s) 130A, 130B can facilitate communication between the user computing device 102 and the patient via the first display 104 and the first camera system 114. As described herein, the server(s) 130A, 130B can communicate with the camera system(s) 114, 134. In some aspects, the server(s) 130A, 130B can transmit machine learning model(s) to the camera system(s) 114, 134. In some aspects, the server(s) 130A, 130B can train machine learning models based on training data sets.

In some aspects, the monitoring system 100A, 100B can present modified images (which can be in a video format) to clinician(s) or other monitoring users. For example, instead of showing actual persons, the monitoring system 100A, 100B can present images where a person has been replaced with a virtual representation (such as a stick figure) and/or a redacted area such as a rectangle.

Figure 2:
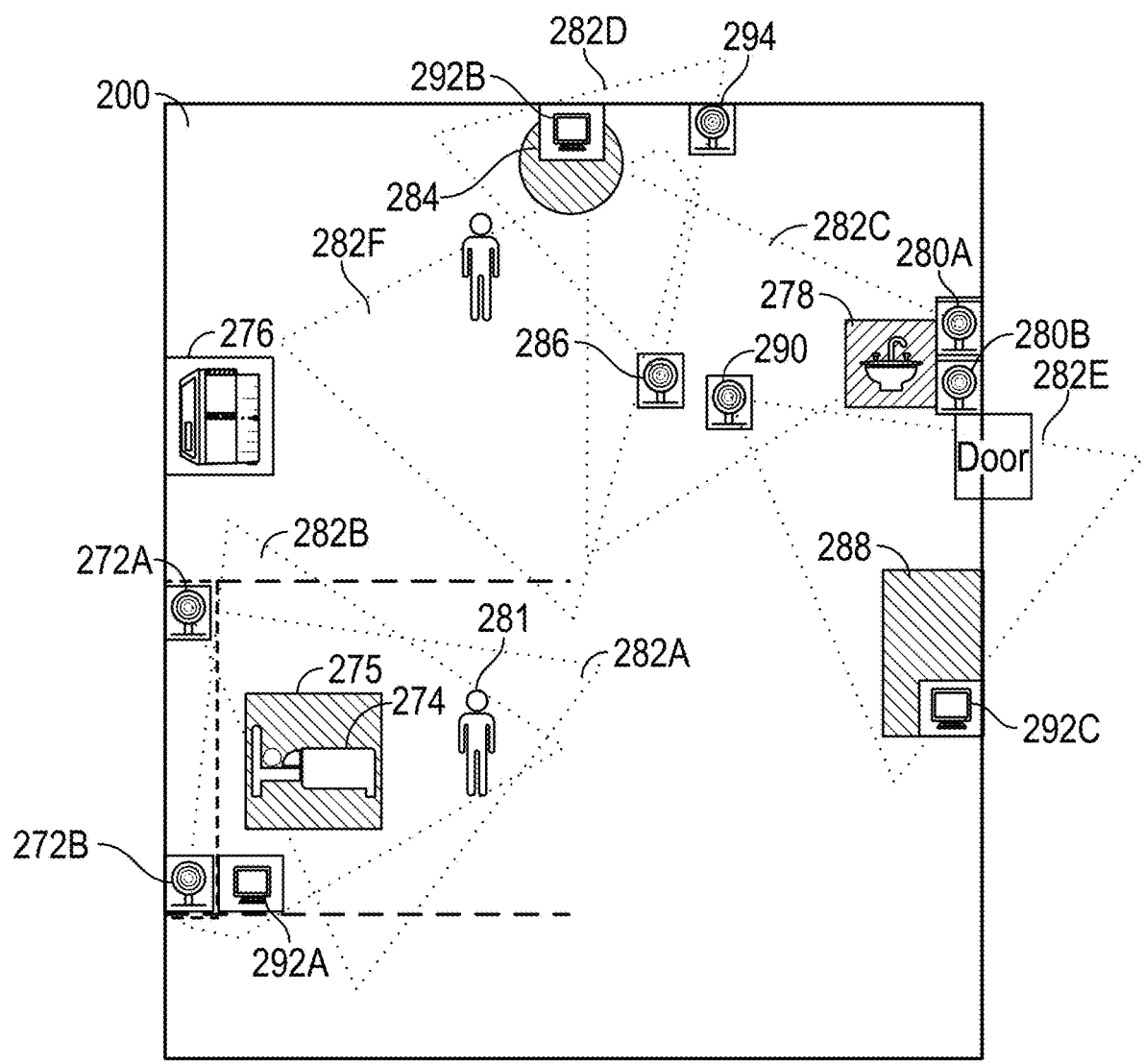
FIG. 2 is a schematic drawing of a monitoring system in a clinical setting.

FIG. 2 is a diagram depicting a monitoring system 200 in another clinical setting with an accompanying legend. The monitoring system 200 can include, but is not limited to, cameras 272A, 272B, 280A, 280B, 286, 290, 294, displays 292A, 292B, 292C, and a server 276. Some of the cameras 272A, 272B, 280A, 280B, 286, 290, 294 can be the same as or similar to the camera system 114 of FIG. 1A. The cameras 272A, 272B, 280A, 280B, 286, 290, 294 can send data and/or images to the server 276. The server 276 can be located in the hospital room, or elsewhere in the hospital, or at a remote location outside the hospital (not illustrated). As shown, in a clinical setting, such as a hospital, hospitalized patients can be lying on hospital beds, such as the hospital bed 274. The bed cameras 272A, 272B can be near a head side of the bed 274 facing toward a foot side of the bed 274. The clinical setting may have a handwashing area 278. The handwashing cameras 280A, 280B can face the handwashing area 278. The handwashing cameras 280A, 280B can have a combined field of view 282C so as to maximize the ability to detect a person's face and/or identification tag when the person is standing next to the handwashing area 278 facing the sink. Via the bed camera(s) 272A, 272B, the monitoring system 200 can detect whether the clinician (or a visitor) is within a patient zone 275, which can be located within a field of view 282A, 282B of the bed camera(s) 272A, 272B. Patient zones can be customized. For example, the patient zone 275 can be defined as a proximity threshold around the hospital bed 274 and/or a patient. In some aspects, the clinician 281 is within the patient zone 275 if the clinician is at least partially within a proximity threshold distance to the hospital bed and/or the patient.

The bed cameras 272A, 272B can be located above a head side of the bed 274, where the patient's head would be at when the patient lies on the bed 274. The bed cameras 272A, 272B can be separated by a distance, which can be wider than a width of the bed 274, and can both be pointing toward the bed 274. The fields of view 282A, 282B of the bed cameras 272A, 272B can overlap at least partially over the bed 274. The combined field of view 282A, 282B can cover an area surrounding the bed 274 so that a person standing by any of the four sides of the bed 274 can be in the combined field of view 282A, 282B. The bed cameras 272A, 272B can each be installed at a predetermined height and pointing downward at a predetermined angle. The bed cameras 272A, 272B can be configured so as to maximize the ability to detect the face of a person standing next to or near the bed 274, independent of the orientation of the person's face, and/or the ability to detect an identification tag that is worn on the person's body, for example, hanging by the neck, the belt, etc. Optionally, the bed cameras 272A, 272B need not be able to identify the patient lying on the bed 274, as the identity of the patient is typically known in clinical and other settings.

In some aspects, the cameras 272A, 272B, 280A, 280B, 286, 290, 294 can be configured, including but not limited to being installed at a height and/or angle, to allow the monitoring system 200 to detect a person's face and/or identification tag, if any. For example, at least some of the cameras 272A, 272B, 280A, 280B, 286, 290, 294 can be installed at a ceiling of the room or at a predetermined height above the floor of the room. The cameras 272A, 272B, 280A, 280B, 286, 290, 294 can be configured to detect an identification tag. Additionally or alternatively, the cameras 272A, 272B, 280A, 280B, 286, 290, 294 can detect faces, which can include extracting facial recognition features of the detected face, and/or to detect a face and the identification tag substantially simultaneously.

In some aspects, the monitoring system 200 can monitor one or more aspects about the patient, the clinician 281, and/or zones. The monitoring system 200 can determine whether the patient is in the bed 274. The monitoring system 200 can detect whether the patient is within a bed zone, which can be within the patient zone 275. The monitoring system 200 can determine an angle of the patient in the bed 274. In some aspects, the monitoring system 200 can include a wearable, wireless sensor device (not illustrated) that can track a patient's posture, orientation, and activity. In some aspects, a wearable, wireless sensor device can include, but is not limited to, a Centroid® device by Masimo Corporation, Irvine, CA. The monitoring system 200 can determine how often the patient has turned in the bed 274 and/or gotten up from the bed 274. The monitoring system 200 can detect turning and/or getting up based on the bed zone and/or facial recognition of the patient. The monitoring system 200 can detect whether the clinician 281 is within the patient zone 275 or another zone. As described herein, the monitoring system 200 can detect whether the clinician 281 is present or not present via one or more methods, such as, but not limited to, facial recognition, identification via an image of an identification tag, and/or RFID based tracking. Similarly, the monitoring system 200 can detect intruders that are unauthorized in one or more zones via one or more methods, such as, but not limited to, facial recognition, identification via an image of an identification tag, and/or RFID based tracking. In some aspects, the monitoring system 200 can issue an alert based on one or more of the following factors: facial detection of an unrecognized face; no positive visual identification of authorized persons via identification tags; and/or no positive identification of authorized persons via RFID tags. In some aspects, the monitoring system 200 can detect falls via one or more methods, such as, but not limited to, machine-vision based fall detection and/or fall detection via wearable device, such as using accelerometer data. Any of the alerts described herein can be presented on the displays 292A, 292B, 292C.

In some aspects, if the monitoring system 200 detects that the clinician 281 is within the patient zone 275 and/or has touched the patient, then the system 200 can assign a "contaminated" status to the clinician 281. The monitoring system 200 can detect a touch action by detecting the actual act of touching by the clinician 281 and/or by detecting the clinician 281 being in close proximity, for example, within less than 1 foot, 6 inches, or otherwise, of the patient. If the clinician 281 moves outside the patient zone 275, then the monitoring system 200 can assign a "contaminated-prime" status to the clinician 281. If the clinician 281 with the "contaminated-prime" status re-enters the same patient zone 275 or enters a new patient zone, monitoring system 200 can output an alarm or warning. If the monitoring system 200 detects a handwashing activity by the clinician 281 with a "contaminated-prime" status, then the monitoring system 200 can assign a "not contaminated" status to the clinician 281.

A person may also be contaminated by entering contaminated areas other than a patient zone. For example, as shown in FIG. 2, the contaminated areas can include a patient consultation area 284. The patient consultation area 284 can be considered a contaminated area with or without the presence of a patient. The monitoring system 200 can include a consultation area camera 286, which has a field of view 282D that overlaps with and covers the patient consultation area 284. The contaminated areas can further include a check-in area 288 that is next to a door of the hospital room. Alternatively and/or additionally, the check-in area 288 can extend to include the door. The check-in area 288 can be considered a contaminated area with or without the presence of a patient. The monitoring system 200 can include an entrance camera 290, which has a field of view 282E that overlaps with and covers the check-in area 288.

As shown in FIG. 2, the monitoring system 200 can include an additional camera 294. Additional cameras may not be directed to any specific contaminated and/or handwashing areas. For example, the additional camera 294 can have a field of view 282F that covers substantially an area that a person likely has to pass when moving from one area to another area of the hospital room, such as from the patient zone 275 to the consultation area 284. Additional camera can provide data to the server 276 to facilitate tracking of movements of the people in the room.

Figure 3:
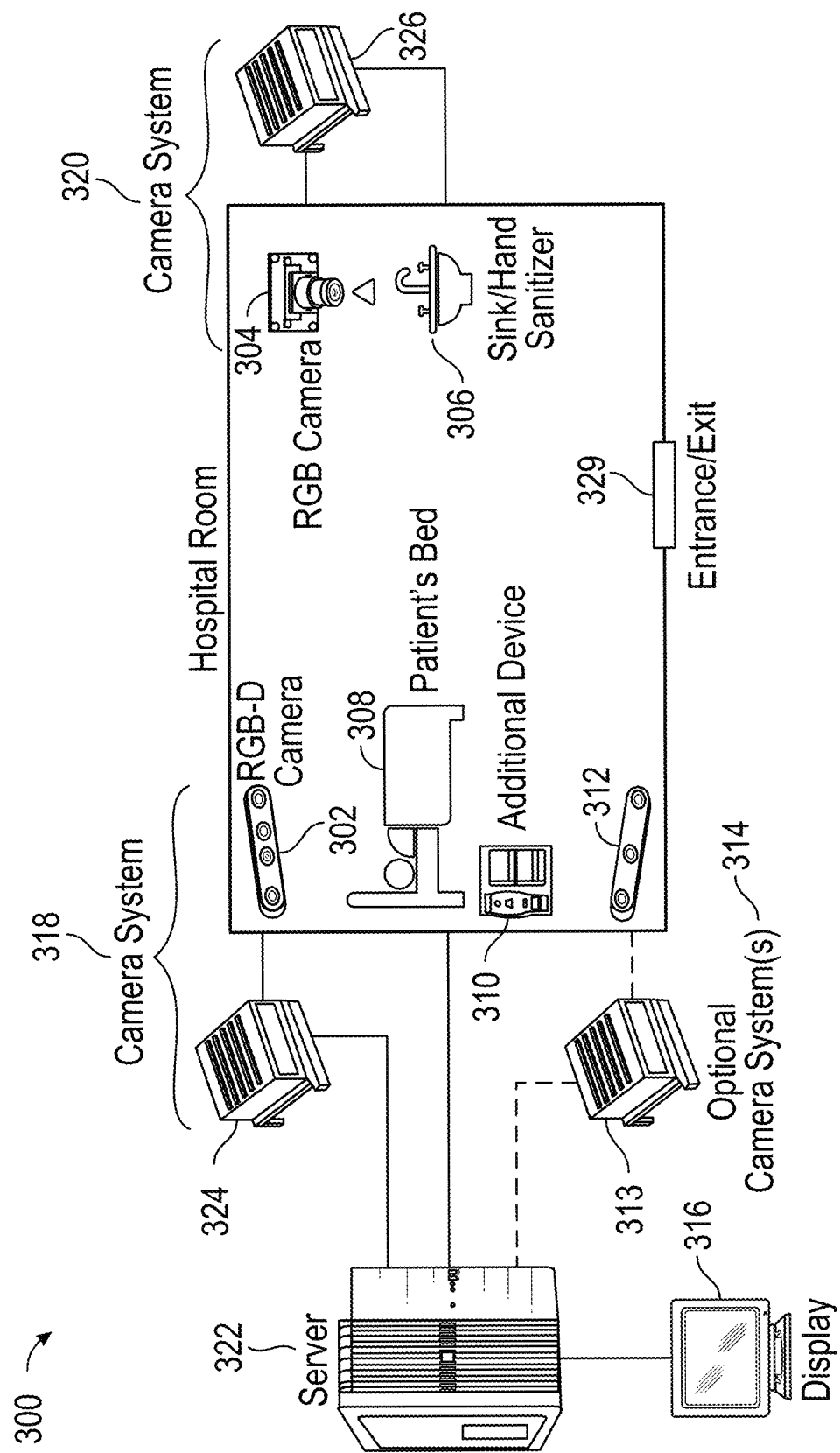
FIG. 3 is another schematic drawing of a monitoring system in a clinical setting.

FIG. 3 depicts a monitoring system 300 in another clinical setting. The monitoring system 300 may monitor the activities of anyone present in the room such as medical personnel, visitors, patients, custodians, etc. As described herein, the monitoring system 300 may be located in a clinical setting such as a hospital room. The hospital room may include one or more patient beds 308. The hospital room may include an entrance/exit 329 to the room. The entrance/exit 329 may be the only entrance/exit to the room.

The monitoring system 300 can include a server 322, a display 316, one or more camera systems 314, 318, 320, and an additional device 310. The camera systems 314, 318, 320 may be connected to the server 322. The server 322 may be a remote server. The one or more camera systems may include a first camera system 318, a second camera system 320, and/or additional camera systems 314. The camera systems 314, 318, 320 may include one or more processors, which can include one or more hardware accelerators. The processors can be enclosed in an enclosure 313, 324, 326 of the camera systems 314, 318, 320. In some aspects, the processors can include, but are not limited to, an embedded processing unit, such as an Nvidia® Jetson Xavier™ NX/AGX, that is embedded in an enclosure of the camera systems 314, 318, 320. The one or more processors may be physically located outside of the room. The processors may include microcontrollers such as, but not limited to, ASICs, FPGAs, etc. The camera systems 314, 318, 320 may each include a camera. The camera(s) may be communication with the one or more processors and may transmit image data to the processor(s). In some aspects, the camera systems 314, 318, 320 can exchange data and state information with other camera systems.

The monitoring system 300 may include a database. The database can include information relating to the location of items in the room such as camera systems, patient beds, handwashing stations, and/or entrance/exits. The database can include locations of the camera systems 314, 318, 320 and the items in the field of view of each camera system 314,

318, 320. The database can further include settings for each of the camera systems. Each camera system 314, 318, 320 can be associated with an identifier, which can be stored in the database. The server 322 may use the identifiers to configure each of the camera systems 314, 318, 320.

As shown in FIG. 3, the first camera system 318 can include a first enclosure 324 and a first camera 302. The first enclosure 324 can enclose one or more hardware processors. The first camera 302 may be a camera capable of sensing depth and color, such as, but not limited to, an RGB-D stereo depth camera. The first camera 302 may be positioned in a location of the room to monitor the entire room or substantially all of the room. The first camera 302 may be tilted downward at a higher location in the room. The first camera 302 may be set up to minimize blind spots in the field of view of the first camera 302. For example, the first camera 302 may be located in a corner of the room. The first camera 302 may be facing the entrance/exit 329 and may have a view of the entrance/exit 329 of the room.

As shown in FIG. 3, the second camera system 320 can include a second enclosure 326 (which can include one or more processors) and a second camera 304. The second camera 304 may be a RGB color camera. Alternatively, the second camera 304 may be an RGB-D stereo depth camera. The second camera 304 may be installed over a hand hygiene compliance area 306. The hand hygiene compliance area 306 may include a sink and/or a hand sanitizer dispenser. The second camera 304 may be located above the hand hygiene compliance area 306 and may be point downwards toward the hand hygiene compliance area 306. For example, the second camera 304 may be located on or close to the ceiling and may have a view the hand hygiene compliance area 306 from above.

In a room of a relatively small size, the first and second camera systems 318, 320 may be sufficient for monitoring the room. Optionally, for example, if the room is of a relatively larger size, the system 300 may include any number of additional camera systems, such as a third camera system 314. The third camera system 314 may include a third enclosure 313 (which can include one or more processors) and a third camera 312. The third camera 312 of the third camera system 314 may be located near the patient's bed 308 or in a corner of the room, for example, a corner of the room that is different than (for example, opposite or diagonal to) the corner of the room where the first camera 302 of the first camera system 318 is located. The third camera 312 may be located at any other suitable location of the room to aid in reducing blind spots in the combined fields of view of the first camera 302 and the second camera 304. The third camera 312 of the third camera system 314 may have a field of view covering the entire room. The third camera system 314 may operate similarly to the first camera system 318, as described herein.

The monitoring system 300 may include one or more additional devices 310. The additional device 310 can be, but is not limited to, a patient monitoring and connectivity hub, bedside monitor, or other patient monitoring device. For example, the additional device 310 can be a Root® monitor by Masimo Corporation, Irvine, CA Additionally or alternatively, the additional device 310 can be, but is not limited to, a display device of a data aggregation and/or alarm visualization platform. For example, the additional device 310 can be a display device (not illustrated) for the Uniview® platform by Masimo Corporation, Irvine, CA The additional device(s) 310 can include smartphones or tablets (not illustrated). The additional device(s) may be in communication with the server 322 and/or the camera systems 318, 320, 314.

The monitoring system 300 can output alerts on the additional device(s) 310 and/or the display 316. The outputted alert may be any auditory and/or visual signal. Outputted alerts can include, but are not limited to, a fall alert, an unauthorized person alert, an alert that a patient should be turned, or an alert that a person has not complied the hand hygiene protocol. For example, someone outside of the room can be notified on an additional device 310 and/or the display 316 that an emergency has occurred in the room. In some aspects, the monitoring system 300 can provide a graphical user interface, which can be presented on the display 316. A configuration user can configure the monitoring system 300 via the graphical user interface presented on the display 316.

Figure 4:
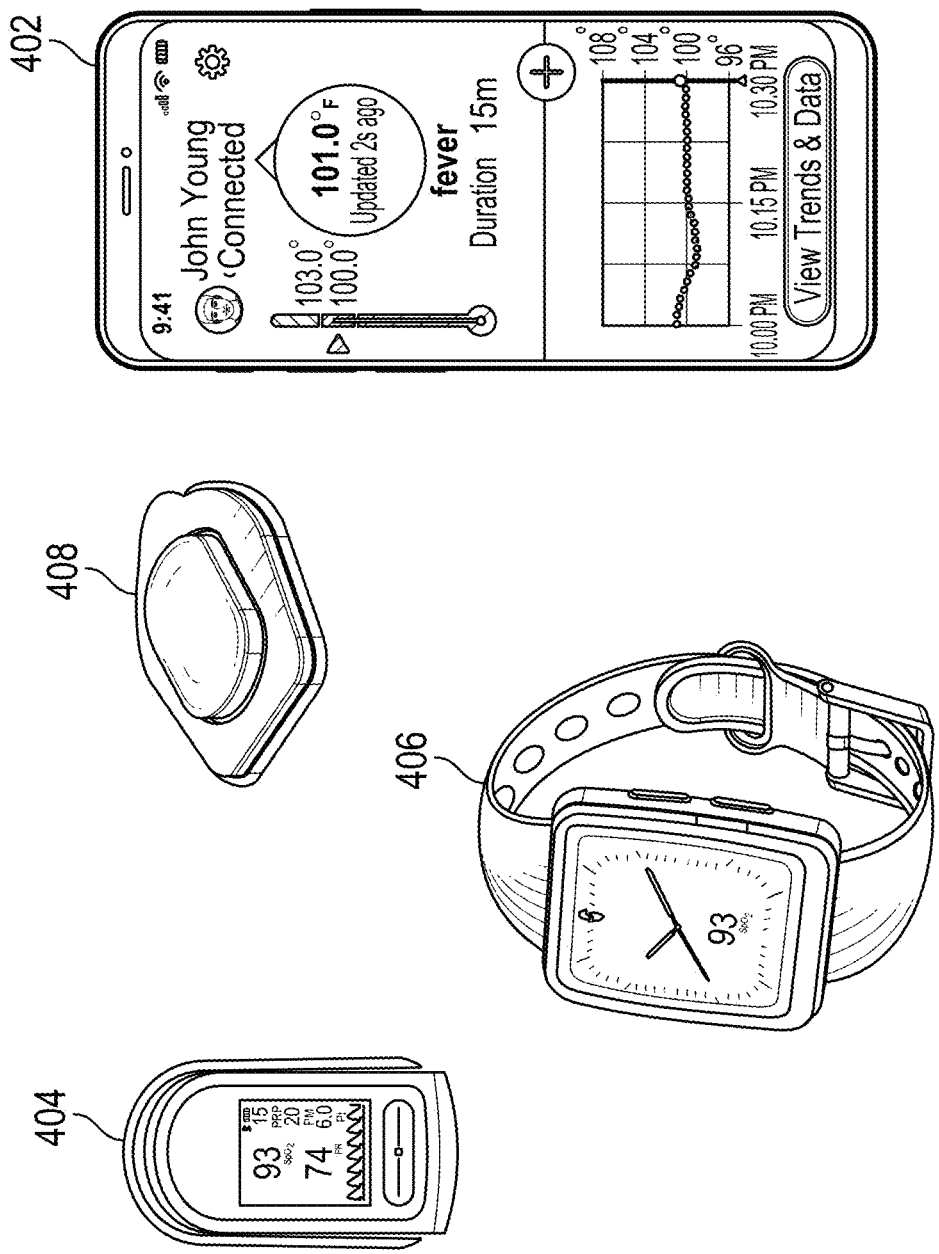
FIG. 4 is a drawing of patient sensor devices that can be used in a monitoring system.

FIG. 4 depicts patient sensor devices 404, 406, 408 (such as a wearable device) and a user computing device 402 (which may not be drawn to scale) that can be used in a monitoring system. In some aspects, one or more of the patient sensor devices 404, 406, 408 can be optionally used in a monitoring system. Additionally or alternatively, patient sensor devices can be used with the monitoring system that are different than the devices 404, 406, 408 depicted in FIG. 4. A patient sensor device can non-invasively measure physiological parameters from a fingertip, wrist, chest, forehead, or other portion of the body. The first, second, and third patient sensor devices 404, 406, 408 can be wirelessly connected to the user computing device 402 and/or a server in the monitoring system. The first patient sensor device 404 can include a display and a touchpad and/or touchscreen. The first patient sensor device 404 can be a pulse oximeter that is designed to non-invasively monitor patient physiological parameters from a fingertip. The first patient sensor device 404 can measure physiological parameters such as, but not limited to, blood oxygen saturation, pulse rate, perfusion index, respiration rate, heart rate, and/or pleth variability index. The first patient sensor device 404 can be a MightySat® fingertip pulse oximeter by Masimo Corporation, Irvine, CA The second patient sensor device 406 can be configured to be worn on a patient's wrist to non-invasively monitor patient physiological parameters from a wrist. The second patient sensor device 406 can be a smartwatch. The second patient sensor device 406 can include a display and/or touchscreen. The second patient sensor device 406 can measure physiological parameters including, but not limited to, blood oxygen saturation, pulse rate, perfusion index, respiration rate, heart rate, and/or pleth variability index. The third patient sensor device 408 can be a temperature sensor that is designed to non-invasively monitor physiological parameters of a patient. In particular, the third patient sensor device 408 can measure a temperature of the patient. The third patient sensor device 408 can be a Radius T°™ sensor by Masimo Corporation, Irvine, CA A patient, clinician, or other authorized user can use the user computing device 408 to view physiological information and other information from the monitoring system.

As shown, a graphical user interface can be presented on the user computing device 402. The graphical user interface can present physiological parameters that have been measured by the patient sensor devices 404, 406, 408. As described herein, the graphical user interface can also present alerts and information from the monitoring system. The graphical user interface can present alerts such as, but not limited to, a fall alert, an unauthorized person alert, an alert that a patient should be turned, or an alert that a person has not complied the hand hygiene protocol.

Figure 5:
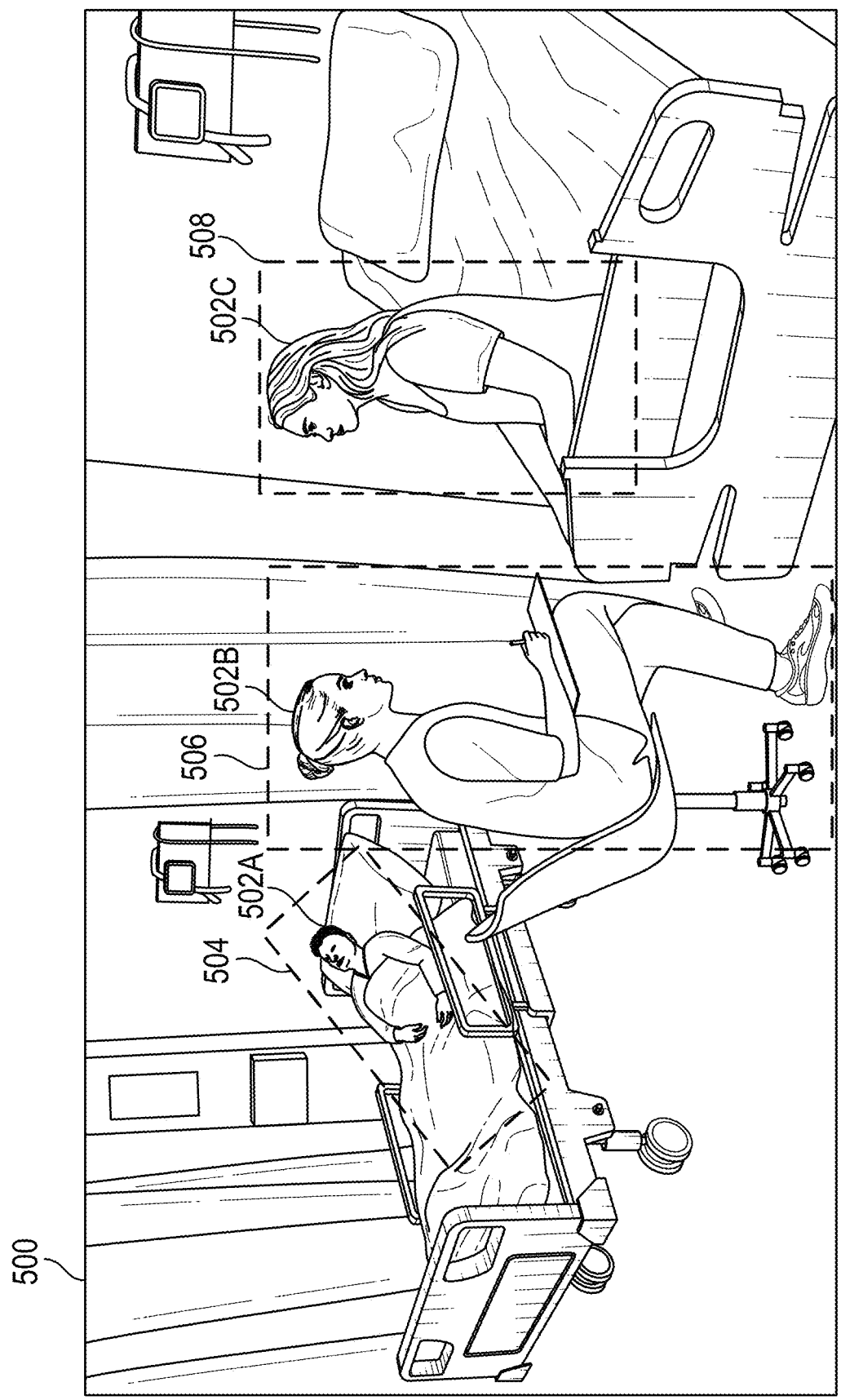
FIG. 5 illustrates a camera image with object tracking.

FIG. 5 illustrates a camera image 500 with object tracking. The monitoring system can track the persons 502A, 502B, 502C in the camera image 500 with the boundary regions 504, 506, 508. In some aspects, each camera system in a monitoring system can be configured to perform object detection. As described herein, some monitoring systems can have a single camera system while other monitoring systems can have multiple camera systems. Each camera system can be configured with multiple machine learning models for object detection. A camera system can receive image data from a camera. The camera can capture a sequence of images (which can be referred to as frames). The camera system can process the frame with a YOLO (You Only Look Once) deep learning network, which can be trained to detect objects (such as persons 502A, 502B, 502C) and return coordinates of the boundary regions 504, 506, 508. In some aspects, the camera system can process the frame with an inception CNN, which can be trained to detect activities, such as hand sanitizing or hand washing (not illustrated). The machine learning models, such as the inception CNN, can be trained using a dataset of a particular activity type, such as handwashing or hand sanitizing demonstration videos, for example.

The camera system can determine processed data that consists of the boundary regions 504, 506, 508 surrounding a detected person 502A, 502B, 502C in the room, such as coordinates of the boundary regions. The camera system can provide the boundary regions to a server in the monitoring system. In some aspects, processed data may not include the images captured by the camera. Advantageously, the images from the camera can be processed locally at the camera system and may not be transmitted outside of the camera system. In some aspects, the monitoring system can ensure anonymity and protect privacy of imaged persons by not transmitting the images outside of each camera system.

The camera system can track objects using the boundary regions. The camera system can compare the intersection of boundary regions in consecutive frames. A sequence of boundary regions associated with an object through consecutive frames can be referred to as a "track." The camera system may associate boundary regions if the boundary regions of consecutive frames overlap by a threshold distance or are within of a threshold distance of another. The camera system may determine that boundary regions from consecutive frames that are adjacent (or the closest with each other) are associated with the same object. Thus, whenever object detection occurs in the field of view of one camera, that object may be associated with the nearest track.

As described herein, the camera system can use one or more computer vision algorithms. For example, a computer vision algorithm can identify a boundary region around a person's face or around a person's body. In some aspects, the camera system can detect faces using a machine learning model, such as, but not limited to, Google's FaceNet. The machine learning model can receive an image of the person's face as input and output a vector of numbers, which can represent features of a face. In some aspects, the camera system can send the extracted facial features to the server. The monitoring system can map the extracted facial features to a person. The vector numbers can represent facial features corresponding to points on ones' face. Facial features of known people (such as clinicians or staff) can be stored in a facial features database, which can be part of the database described herein. To identify an unknown individual, such as a new patient or a visitor, the monitoring system can initially mark the unknown person as unknown and subsequently identify the same person in multiple camera images. The monitoring system can populate a database with the facial features of the new person.

Figure 6:
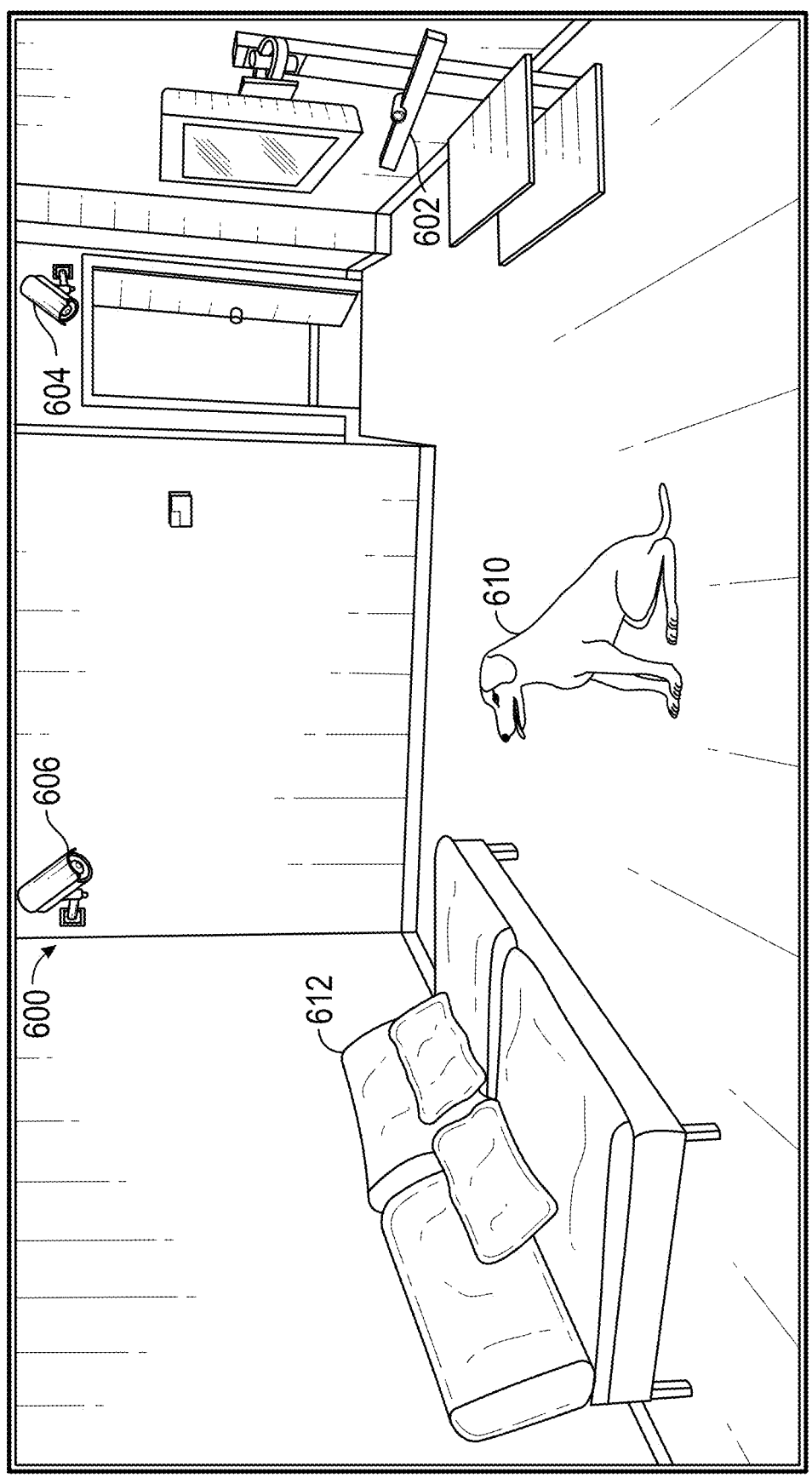
FIG. 6 is a drawing of a monitoring system in a home setting.

FIG. 6 depicts a monitoring system 600 in a home setting. The monitoring system 600 can include, but is not limited to, one or more cameras 602, 604, 606. Some of the cameras, such as a first camera 602 of the monitoring system 600, can be the same as or similar to the camera system 114 of FIG. 1A. In some aspects, the cameras 602, 604, 606 can send data and/or images to a server (not illustrated). The monitoring system 600 can be configured to detect a pet 610 using the object identification techniques described herein. The monitoring system 600 can be further configured to determine if a pet 610 was fed or if the pet 610 is chewing or otherwise damaging the furniture 612. In some aspects, the monitoring system 600 can be configured to communicate with a home automation system. For example, if the monitoring system 600 detects that the pet 610 is near a door, the monitoring system 600 can instruct the home automation system to open the door. In some aspects, the monitoring system 600 can provide alerts and/or commands in the home setting to deter a pet from some activity (such as biting a couch, for example).

Figure 7:
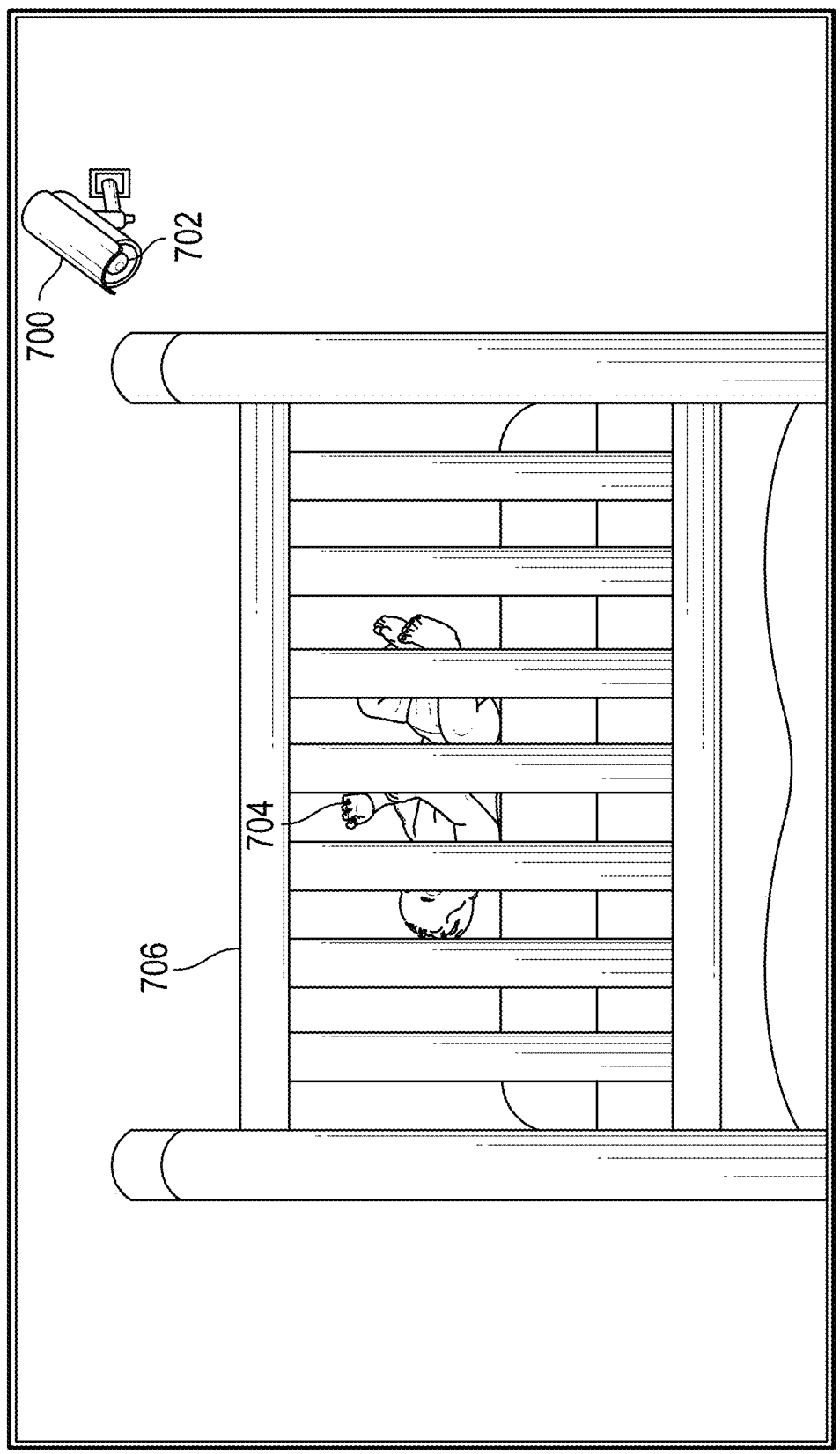
FIG. 7 is a drawing of a monitoring system configured for baby monitoring.

FIG. 7 depicts a monitoring system 700 in an infant care setting. The monitoring system 700 can include one or more cameras 702. In some aspects, a camera in the monitoring system 700 can send data and/or images to a server (not illustrated). The monitoring system 700 can be configured to detect an infant 704 using the object identification techniques described herein. Via a camera, the monitoring system 700 can detect whether a person is within an infant zone, which can be located within a field of view of the camera 702. Infant zones can be similar to patient zones, as described herein. For example, an infant zone can be defined as a proximity threshold around a crib 706 and/or the infant 704. In some aspects, a person is within the infant zone if the person is at least partially within a proximity threshold distance to the crib 706 and/or the infant 704. The monitoring system 700 can use object tracking, as described herein, to determine if the infant 704 is moved. For example, the monitoring system 700 can issue an alert if the infant 704 leaves the crib 706. The monitoring system 700 can include one or more machine learning models.

The monitoring system 700 can detect whether an unauthorized person is within the infant zone. The monitoring system 700 can detect whether an unauthorized person is present using one or more methods, such as, but not limited to, facial recognition, identification via an image of an identification tag, and/or RFID based tracking. Identification tag tracking (whether an identification badge, RFID tracking, or some other tracking) can be appliable to hospital-infant settings. In some aspects, the monitoring system 700 can issue an alert based on one or more of the following factors: facial detection of an unrecognized face; no positive visual identification of authorized persons via identification tags; and/or no positive identification of authorized persons via RFID tags.

As described herein, a machine learning model of the monitoring system 700 can receive an image of a person's face as input and output a vector of numbers, which can represent features of a face. The monitoring system 700 can map the extracted facial features to a known person. For example, a database of the monitoring system 700 can store a mapping from facial features (but not actual pictures of faces) to person profiles. If the monitoring system 700 cannot match the features to features from a known person, the monitoring system 700 can mark person as unknown and issue an alert. Moreover, the monitoring system 700 can issue another alert if the unknown person moves the infant 704 outside of a zone.

In some aspects, the monitoring system 700 can monitor movements of the infant 704. The monitoring system 700 can monitor a color of the infant for physiological concerns. For example, the monitoring system can detect a change in color of skin (such as a bluish color) since that might indicate potential asphyxiation. The monitoring system 700 can use trained machine learning models to identify skin color changes. The monitoring system 700 can detect a position of the infant 704. For example, if the infant 704 rolls onto their stomach, the monitoring system 700 can issue a warning since it may be safer for the infant 704 to lay on their back. The monitoring system 700 can use trained machine learning models to identify potentially dangerous positions. In some aspects, a non-invasive sensor device (not illustrated) can be attached to the infant 704 (such as a wristband or a band that wraps around the infant's foot) to monitor physiological parameters of the infant. The monitoring system 700 can receive the physiological parameters, such as, but not limited to, blood oxygen saturation, pulse rate, perfusion index, respiration rate, heart rate, and/or pleth variability index. In some aspects, the monitoring system 700 can include a microphone that can capture audio data. The monitoring system 700 can detect sounds from the infant 704, such as crying. The monitoring system 700 can issue an alert if the detected sounds are above a threshold decibel level. Additionally or alternatively, the monitoring system 700 can process the sounds with a machine learning model. For example, the monitoring system 700 can convert sound data into spectrograms, input them into a CNN and a linear classifier model, and output a prediction whether the sounds (such as excessive crying) should cause a warning to be issued. In some aspects, the monitoring system 700 can include a thermal camera. The monitoring system 700 can use trained machine learning models to identify a potentially wet diaper from an input thermal image.

Efficient Machine Learning Model Application

Figure 8:
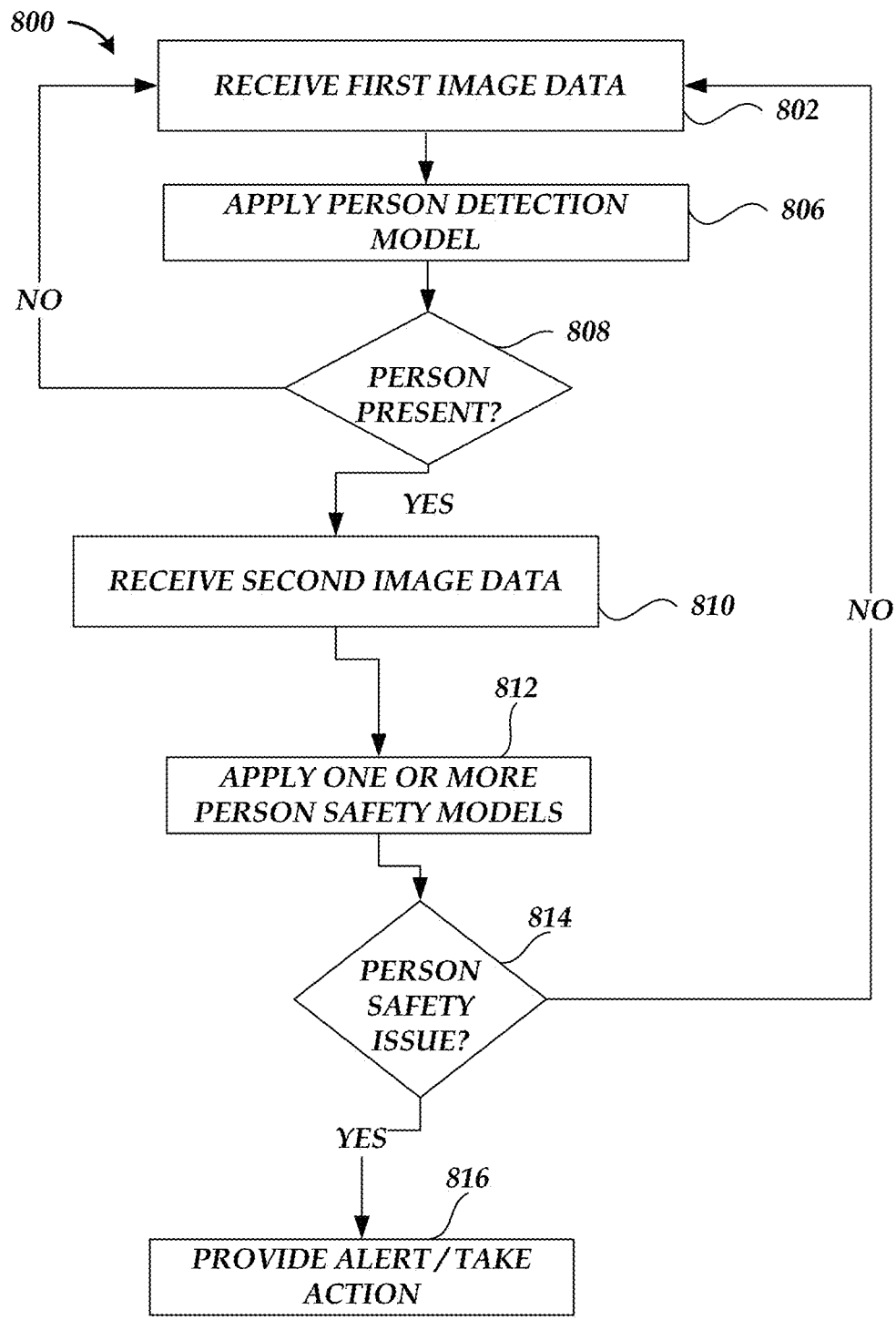
FIG. 8 is a flowchart of a method for efficiently applying machine learning models.

FIG. 8 is a flowchart of a method 800 for efficiently applying machine learning models, according to some aspects of the present disclosure. As described herein, a monitoring system, which can include a camera system, may implement aspects of the method 800 as described herein. The method 800 may include fewer or additional blocks and/or the blocks may be performed in order different than is illustrated.

Beginning at block 802, image data can be received. A camera system (such as the camera systems 114, 318 of FIGS. 1A, 3 described herein) can receive image data from a camera. Depending on the type of camera and configuration of the camera, the camera system can receive different types of images, such as 4K, 1080p, 8 MP images. Image data can also include, but is not limited to, a sequence of images. A camera in a camera system can continuously capture images. Therefore, the camera in a camera system can capture images of objects (such as a patient, a clinician, an intruder, the elderly, an infant, a youth, or a pet) in a room either at a clinical facility, a home, or an assisted living home.

At block 806, a person detection model can be applied. The camera system can apply the person detection model based on the image data. In some aspects, the camera system can invoke the person detection model on a hardware accelerator. The hardware accelerator can be configured to accelerate the application of machine learning models, including a person detection model. The person detection model can be configured to receive image data as input. The person detection model can be configured to output a classification result. In some aspects, the classification result can indicate a likelihood (such as a percentage chance) that the image data includes a person. In other aspects, the classification result can be a binary result: either the object is predicted as present in the image or not. The person detection model can be, but is not limited to, a CNN. The person detection model can be trained to detect persons. For example, the person detection model can be trained with a training data set with labeled examples indicating whether the input data includes a person or not.

At block 808, it can be determined whether a person is present. The camera system can determine whether a person is present. The camera system can determine whether a person object is located in the image data. The camera system can receive from the person detection model (which can execute on the hardware accelerator) the output of a classification result. In some aspects, the output can be a binary result, such as, "yes" there is a person object present or "no" there is not a person object present. In other aspects, the output can be a percentage result and the camera system can determine the presence of a person if the percentage result is above a threshold. If a person is detected, the method 800 proceeds to the block 810 to receive second image data. If a person is not detected, the method 800 proceeds to repeat the previous blocks 802, 806, 808 to continue checking for persons.

At block 810, second image data can be received. The block 810 for receiving the second image data can be similar to the previous block for receiving image data. Moreover, the camera in the camera system can continuously capture images, which can lead to the second image data. As described herein, the image data can include multiple images, such as a sequence of images.

At block 812, one or more person safety models can be applied. In response to detecting a person, the camera system can apply one or more person safety models. The camera system can invoke (which can be invoked on a hardware accelerator) a fall detection model based on the second image data. The fall detection model can output a classification result. In some aspects, the fall detection model can be or include a CNN. The camera system can pre-process the image data. In some aspects, the camera system can covert an image into an RGB image, which can be a m-by-n-by-3 data array that defines red, green, and blue color components for each individual pixel in the image. In some aspects, the camera system can compute an optical flow from the image data (such as the RGB images), which can be a two-dimensional vector field between two images. The two-dimensional vector field can show how the pixels of an object in the first image move to form the same object in the second image. The fall detection model can be pre-trained to perform feature extraction and classification of the image data (which can be pre-processed image data) to output a classification result. In some aspects, the fall detection model can be made of various layers, such as, but not limited to, a convolution layer, a max pooling layer, and a regularization layer, and a classifier, such as, but not limited to, a softmax classifier.

As described herein, in some aspects, an advantage of performing the previous blocks 802, 806, 808 for checking whether a person is present is that more computationally expensive operations, such as applying one or more person safety models, can be delayed until a person is detected. The camera system can invoke (which can be invoked on a hardware accelerator) multiple person safety models based on the second image data. For each person safety model that is invoked, the camera system can receive a model result, such as but not limited to, a classification result. As described herein, the person safety models can include a fall detection model, a handwashing detection model, and/or an intruder detection model.

At block 814, it can be determined whether there is a person safety issue. The camera system can determine whether there is a person safety issue. As described above, for each person safety model that is invoked, the camera system can receive a model result as output. For some models, the output can be a binary result, such as, "yes" a fall has been detected or "no" a fall has not been detected. For other models, the output can be a percentage result and the camera system can determine a person safety issue exists if the percentage result is above a threshold. In some aspects, evaluation of the one or more person safety models can result in an issue detection if at least one model returns a result that indicates issue detection. If a person safety issue is detected, the method 800 proceeds to block 816 to provide an alert and/or take an action. If a person safety issue is not detected, the method 800 proceeds to repeat the previous blocks 802, 806, 808 to continue checking for persons.

At block 816, an alert can be provided and/or an action can be taken. In some aspects, the camera system can initiate an alert. The camera system can notify a monitoring system to provide an alert. In some aspects, a user computing device 102 can receive an alert about a safety issue. In some aspects, a clinician 110 can receive an alert about the safety issue. In some aspects, the camera system can initiate an action. The camera system can cause the monitoring system to take an action. For example, the monitoring system can automatically notify emergency services (such as an emergency hotline and/or an ambulance service) to send someone to help.

Figure 9:
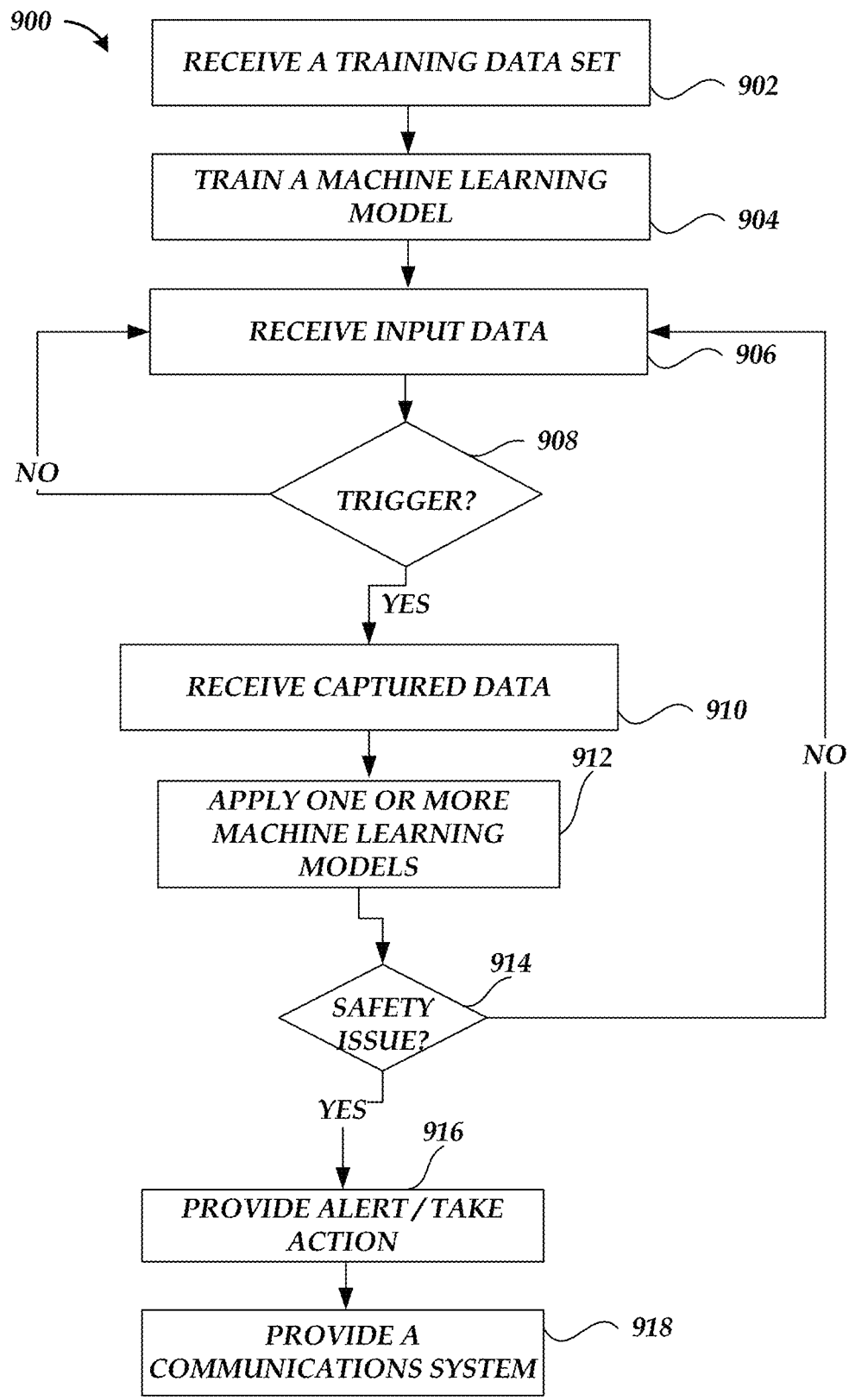
FIG. 9 is a flowchart of another method for efficiently applying machine learning models.

FIG. 9 is a flowchart of another method 900 for efficiently applying machine learning models, according to some aspects of the present disclosure. As described herein, a monitoring system, which can include a camera system, may implement aspects of the method 900 as described herein. The method 900 may include fewer or additional blocks and/or the blocks may be performed in order different than is illustrated. The block(s) of the method 900 of FIG. 9 can be similar to the block(s) of the method 800 of FIG. 8. In some aspects, the block(s) of the method 900 of FIG. 9 can be used in conjunction with the block(s) of the method 800 of FIG. 8.

Beginning at block 902, a training data set can be received. The monitoring system can receive a training data set. In some aspects, a first set of videos of person falls can be collected and a second set of videos of persons without falling can be collected. A training data set can be created with the first set of videos and the second set of videos. Other training data sets can be created. For example, for machine learning of handwashing, a first set of videos of with handwashing and a second set of videos without handwashing can be collected; and a training data set can be created from the first set of videos and the second set of videos. For machine learning detection of dilated pupils, a first set of images of with dilated pupils and a second set of images without dilated pupils can be collected; and a training data set can be created from the first set of images and the second set of images. For machine learning detection of facial paralysis, a first set of images of with facial paralysis and a second set of images without facial paralysis can be collected; and a training data set can be created from the first set of images and the second set of images. For machine learning detection of an infant, a first set of images of with an infant and a second set of images without an infant can be collected; and a training data set can be created from the first set of images and the second set of images. For machine learning detection of an infant's position, a first set of images of an infant on their back and a second set of images of an infant on their stomach or their side; and a training data set can be created from the first set of images and the second set of images. For machine learning detection of an unconsciousness state, a first set of videos of persons in an unconscious state and a second set of videos of a person in a state of consciousness; and a training data set can be created from the first set of videos and the second set of videos. For other machine learning detection of an unconsciousness state, a first set of audio recordings of persons in an unconscious state and a second set of audio recordings of a person in a state of consciousness; and a training data set can be created from the first set of audio recordings and the second set of audio recordings. The monitoring system can receive training data sets for any of the machine learning models described herein that can be trained with supervised machine learning.

At block 904, a machine learning model can be trained. The monitoring system can train one or more machine learning models. The monitoring system can train a fall detection model using the training data set from the previous block 902. The monitoring system can train a handwashing detection model using the training data set from the previous block 902. The monitoring system can train any of the machine learning models described herein that use supervised machine learning.

In some aspects, the monitoring system can train a neural network, such as, but not limited to, a CNN. The monitoring system can initiate the neural network with random weights. During the training of the neural network, the monitoring system feeds labelled data from the training data set to the neural network. Class labels can include, but are not limited to, fall, no fall, hand washing, no hand washing, loud noise, no loud noise, normal pupils, dilated pupils, no facial paralysis, facial paralysis, infant, no infant, supine position, prone position, side position, unconscious, conscious, etc. The neural network can process each input vector with its values being assigned randomly and then make comparisons with the class label of the input vector. If the output prediction does not match the class label, an adjustment to the weights of the neural network neurons are made so that output correctly matches the class label. The corrections to the value of weights can be made through a technique, such as, but not limited to backpropagation. Each run of training of the neural network can be called an "epoch." The neural network can go through several series of epochs during the process of training, which results in further adjusting of the neural network weights. After each epoch step, the neural network can become more accurate at classifying and correctly predicting the class of the training data. After training the neural network, the monitoring system can use a test dataset to verify the neural network's accuracy. The test dataset can be a set of labelled test data that were not included in the training process. Each test vector can be fed to the neural network, and the monitoring system can compare the output to the actual class label of the test input vector.

At block 906, input data can be received. The camera system can receive input data. In some aspects, the block 906 for receiving input data can be similar to the block 802 of FIG. 8 for receiving image data. The camera system can receive image data from a camera. In some aspects, other input data can be received. For example, the camera system can receive a current time. The camera system can receive an RFID signal (which can be used for identification purposes, as described herein). The camera system can receive physiological values (such as blood oxygen saturation, pulse rate, perfusion index, respiration rate, heart rate, and/or pleth variability index) from a patient sensor device, such as a wearable device.

At block 908, it can be determined whether a trigger has been satisfied. The camera system can determine whether a trigger has been satisfied to apply one or more machine learning models. In some aspects, the camera system can determine whether a trigger has been satisfied by checking whether a person has been detected. In some aspects, the camera system can determine whether a trigger has been satisfied by checking whether the current time satisfies a trigger time window, such as, but not limited to, a daily time check-up window. If a trigger is satisfied, the method 900 proceeds to the block 910 to receive captured data. If a trigger is not detected, the method 900 proceeds to repeat the previous blocks 906, 908 to continue checking for triggers.

In some aspects, a trigger can be determined based on a received physiological value. The camera system can determine to begin a monitoring process based on a physiological value. In some aspects, the wearable device can include a pulse oximetry sensor and the physiological value is for blood oxygen saturation. The camera system can determine that the physiological value is below a threshold level (such as blood oxygen below 88%, 80%, or 70%, etc.). In some aspects, the wearable device can include a respiration rate sensor and the physiological value is for respiration rate. The camera system can determine that the physiological value satisfies a threshold alarm level (such as respiration rate under 12 or over 25 breaths per minute). In some aspects, the wearable device can include a heart rate sensor, the physiological value is for heart rate, and the multiple physiological values measuring heart rate over time can be received from the wearable device. The camera system can determine that the physiological values satisfies a threshold alarm level, such as, but not limited to, heart rate being above 100 beats per minute for a threshold period of time or under a threshold level for threshold period of time.

At block 910, captured data can be received. The block 910 for receiving captured data can be similar to the previous block 906 for receiving input data. Moreover, the camera in the camera system can continuously capture images, which can lead to the captured data. In some aspects, the camera system can receive audio data from a microphone. In some aspects, the camera system can be configured to cause presentation, on a display, of a prompt to cause a person to perform an activity. The camera system can receive, from a camera, image data of a recording of the activity.

At block 912, one or more machine learning models can be applied. In response to determining that a trigger has been satisfied, the camera system can apply one or more machine learning models based on the captured data. The camera system can invoke (which can be invoked on a hardware accelerator) one or more machine learning models, which can output a model result. The camera system can invoke a fall detection model based on image data where the fall detection model can output a classification result. The camera system can invoke a loud noise detection model based on the audio data where the loud noise detection model can output a classification result. In some aspects, the camera system can generate a spectrogram data from the audio data and provide the spectrogram data as input to the loud noise detection model. The camera system can invoke a facial feature extraction model based on the image data where the facial feature extraction model can output a facial feature vector. The camera system can invoke a handwashing detection model based on the image data where the handwashing detection model can output a classification result. The camera system can invoke a screening machine learning model based on image data where the screening machine learning model can output a model result. The screening machine learning model can include, but is not limited to, a pupillometry screening model or a facial paralysis screening model.

In some aspects, in response to determining to begin the monitoring process, the camera system can invoke one or more machine learning models. The camera system can invoke (which can be on a hardware accelerator) a first unconscious detection model based on the image data where the first unconscious detection model outputs a first classification result. The camera system can invoke (which can be on the hardware accelerator) a second unconscious detection model based on the audio data where the second unconscious detection model outputs a second classification result.

At block 914, it can be determined whether there is a safety issue. The camera system can determine whether there is a safety issue. For each machine learning model that is invoked, the camera system can receive a classification result as output. For some models, the output can be a binary result, such as, "yes" a fall has been detected or "no" a fall has not been detected. For other models, the output can be a percentage result and the camera system can determine a safety issue exists if the percentage result is above a threshold. In some aspects, evaluation of the one or more machine learning models can result in an issue detection if at least one model returns a result that indicates issue detection. The camera system can detect a potential fall based on the classification result. The camera system can detect a potential scream or loud noise based on the classification result from a loud noise detection model. The camera system can execute a query of a facial features database based on the facial feature vector where executing the query can indicate that the facial feature vector is not present in a facial features database, which can indicate a safety issue. The camera system can detect a potential screening issue based on the classification result. The potential screening issue can indicate, but is not limited to, potential dilated pupils or potential facial paralysis. In some aspects, based on the output from one or more machine learning models, the camera system can detect a potential state of unconsciousness. If a safety issue is detected, the method 900 proceeds to block 916 to provide an alert and/or take an action. If a safety issue is not detected, the method 900 proceeds to repeat the previous blocks 906, 908 to continue checking for triggers.

At block 916, an alert can be provided and/or an action can be taken. In some aspects, the camera system can initiate an alert. The camera system can notify a monitoring system to provide an alert. In some aspects, the camera system can initiate an action. In some aspects, the block 916 for providing an alert and/or taking an action can be similar to the block 816 of FIG. 8 for providing an alert and/or taking an action. In response to detecting an issue, such as, but not limited to, detecting a potential fall, loud noise, scream, lack of handwashing, dilated pupils, facial paralysis, intruder, state of unconsciousness, etc., the monitoring system can provide an alert. The monitoring system can escalate alerts. For example, in response to detecting a potential fall and a potential scream or loud noise, the monitoring system can provide an escalated alert. The camera system can cause the monitoring system to take an action. For example, the monitoring system can automatically notify emergency services (such as an emergency hotline and/or an ambulance service) to send someone to help.

In some aspects, the monitoring system can allow privacy options. For example, some user profiles can specify that the user computing devices associated with those profiles should not receive alerts (which can be specified for a period of time). However, the monitoring system can include an alert escalation policy such that alerts can be presented via user computing devices based on one or more escalation conditions. For example, if an alert isn't responded to a for a period of time, the monitoring system can escalate the alert. As another example, if a quantity of alerts exceed a threshold, then the monitoring system can present an alert via user computing devices despite user preferences otherwise.

At block 918, a communications system can be provided. The monitoring system can provide a communications system. The camera system can receive, from a computing device, first video data (such as, but not limited to, video data of a clinician, friends, or family of a patient). The camera system can cause presentation, on the display, of the first video data. The camera system can receive, from the camera, second video data and transmit, to the computing device, the second video data.

Elderly Care Features

Some of the aspects described herein can be directed towards elderly care features. The monitoring systems described herein can be applied to assisted living and/or home settings for the elderly. The monitoring systems described herein, which can include camera systems, can generally monitor activities of the elderly. The monitoring systems described herein can initiate check-up processes, including, but not limited to, dementia checks. In some aspects, a check-up process can detect a color of skin to detect possible physiological changes. The monitoring system can perform stroke detection by determining changes in facial movements and/or speech patterns. The monitoring system can track medication administration and provide reminders if medication is not taken. For example, the monitoring can monitor a cupboard or medicine drawer and determine whether medication is taken based on activity in those areas. In some aspects, some of the camera systems can be outdoor camera systems. The monitoring system can track when a person goes for a walk, log when the person leaves and returns, and potentially issues an alert if a walk exceeds a threshold period of time. In some aspects, the monitoring system can track usage of good hygiene practices, such as but not limited to, handwashing, brushing teeth, or showering (e.g., tracking that a person enters a bathroom at a showering time). The monitoring system can keep track of whether a person misses a check-up. In some aspects, a camera system can include a thermal camera, which can be used to identify a potentially wet adult diaper from an input thermal image.

With respect to FIG. 9, the method 900 for efficiently applying machine learning models can be applied to elderly care settings. At block 902, a training data set can be received. The monitoring system can receive a training data set, which can be used to train machine learning models to be used in check-up processes for the elderly, such as checking for dilated pupils or facial paralysis. For machine learning of dilated pupils, a first set of images of with dilated pupils and a second set of images without dilated pupils can be collected; and a training data set can be created from the first set of images and the second set of images. For machine learning of facial paralysis, a first set of images of with facial paralysis and a second set of images without facial paralysis can be collected; and a training data set can be created from the first set of images and the second set of images.

At block 904, a machine learning model can be trained. A server in the monitoring system can train a pupillometry screening model using the training data set. The server in the monitoring system can train a facial paralysis screening model using the training data set.

At block 906, input data can be received. The camera system can receive input data, which can be used to determine if a trigger has been satisfied for application of one or more machine learning models. The camera system can receive image data from a camera. The camera system can receive a current time. The camera system can receive an RFID signal, which can be used for person identification and/or detection.

In some aspects, the monitoring system can include patient sensor devices, such as, but not limited to, wearable devices. The wearable device can be configured to process sensor signals to determine a physiological value for the person. The monitoring system can receive a physiological value from the wearable device. In some aspects, the wearable device can include a pulse oximetry sensor and the physiological value can be for blood oxygen saturation. In some aspects, the wearable device can be configured to process the sensor signals to measure at least one of blood oxygen saturation, pulse rate, perfusion index, respiration rate, heart rate, or pleth variability index. Some of the wearable devices can be used for an infant.

At block 908, it can be determined whether a trigger has been satisfied. The camera system can determine whether a trigger has been satisfied to apply one or more machine learning models. The camera system can determine whether a check-up process should begin from a current time. For example, the monitoring system can conduct check-up processes at regular intervals, such as once or two a day, which can be at particular times, such as a morning check-up time or an afternoon check-up time. As described herein, another trigger type can be detection of a person. The camera system can invoke a person detection model based on image data where the person detection model outputs classification result; and detect a person based on the classification result. If a trigger is satisfied, the method 900 proceeds to the block 910 to receive captured data. If a trigger is not detected, the method 900 proceeds to repeat the previous blocks 906, 908 to continue checking for triggers.

At block 910, captured data can be received. In response to determining to begin the check-up process, the monitoring system can cause presentation, on a display, of a prompt to cause a person to perform a check-up activity. In some aspects, the check-up activity can check for signs of dementia. A check-up activity can include having a person standing a particular distance from the camera system. A check-up activity can include simple exercises. The prompts can cause a user to say something or perform tasks. The person can be prompted to perform math tasks, pattern recognition, solve puzzles, and/or identify photos of family members. For example, the person can be prompted to point to sections of the display, which can correspond to answers to check-up tests. The check-up tests can check for loss of motor skills. In some aspects, the check-up activity can include a virtual physical or appointment conducted by a clinician. The camera system can receive, from the camera, image data of a recording of the check-up activity. In some aspects, the camera system can receive other input, such as, but not limited to, audio data from a microphone.

At block 912, one or more machine learning models can be applied. In response to determining that a trigger has been satisfied, the camera system can apply one or more machine learning models based on the captured data. In some aspects, in response to determining to begin the check-up process, the camera system can invoke a screening machine learning model based on image data where the screening machine learning model can output a model result (such as a classification result). The screening machine learning model can include, but is not limited to, a pupillometry screening model, a facial paralysis screening model, or a gesture detection model. The gesture detection model can be configured to detect a gesture directed towards a portion of the display. For example, during a dementia test, the person can be prompted to point to a portion of the display and the gesture detection model can identify a point gesture, such as but not limited to, pointing to a quadrant on the display. In some aspects, in response to detecting a person, the camera system can invoke a handwashing detection model based on image data wherein the handwashing detection model outputs a classification result.

At block 914, it can be determined whether there is a safety issue. The camera system can determine whether there is a safety issue, such as a potential screening issue. The camera system can detect a potential screening issue based on the model result. The potential screening issue can indicate, but is not limited to, potential dilated pupils or potential facial paralysis. The monitoring system can determine whether there is a potential screening issue based on output from a gesture detection model. For example, the monitoring system can use detected gesture to determine an answer and an incorrect answer can indicate a potential screening issue. If a safety issue is detected, the method 900 proceeds to block 916 to provide an alert and/or take an action. If a safety issue is not detected, the method 900 proceeds to repeat the previous blocks 906, 908 to continue checking for triggers.

At block 916, an alert can be provided. In some aspects, the camera system can initiate an alert. The camera system can notify a monitoring system to provide one or more alerts. In response to detecting an issue in an elderly care setting, such as, but not limited to, detecting a potential fall, loud noise, scream, lack of handwashing, dilated pupils, facial paralysis, intruder, etc., the monitoring system can provide an alert. The monitoring system can escalate alerts. For example, in response to detecting a potential fall and a potential scream or loud noise, the monitoring system can provide an escalated alert. In some aspects, the monitoring system can provide alerts via different networks (such as Wi-Fi or cellular) and/or technologies (such as Bluetooth).

At block 918, a communications system can be provided. The monitoring system can provide a communications system in an elderly care setting. The camera system can receive, from a computing device, first video data (such as, but not limited to, video data of a clinician, friends, or family of a patient). The camera system can cause presentation, on the display, of the first video data. The camera system can receive, from the camera, second video data and transmit, to the computing device, the second video data.

Infant Care Features

Figure 10:
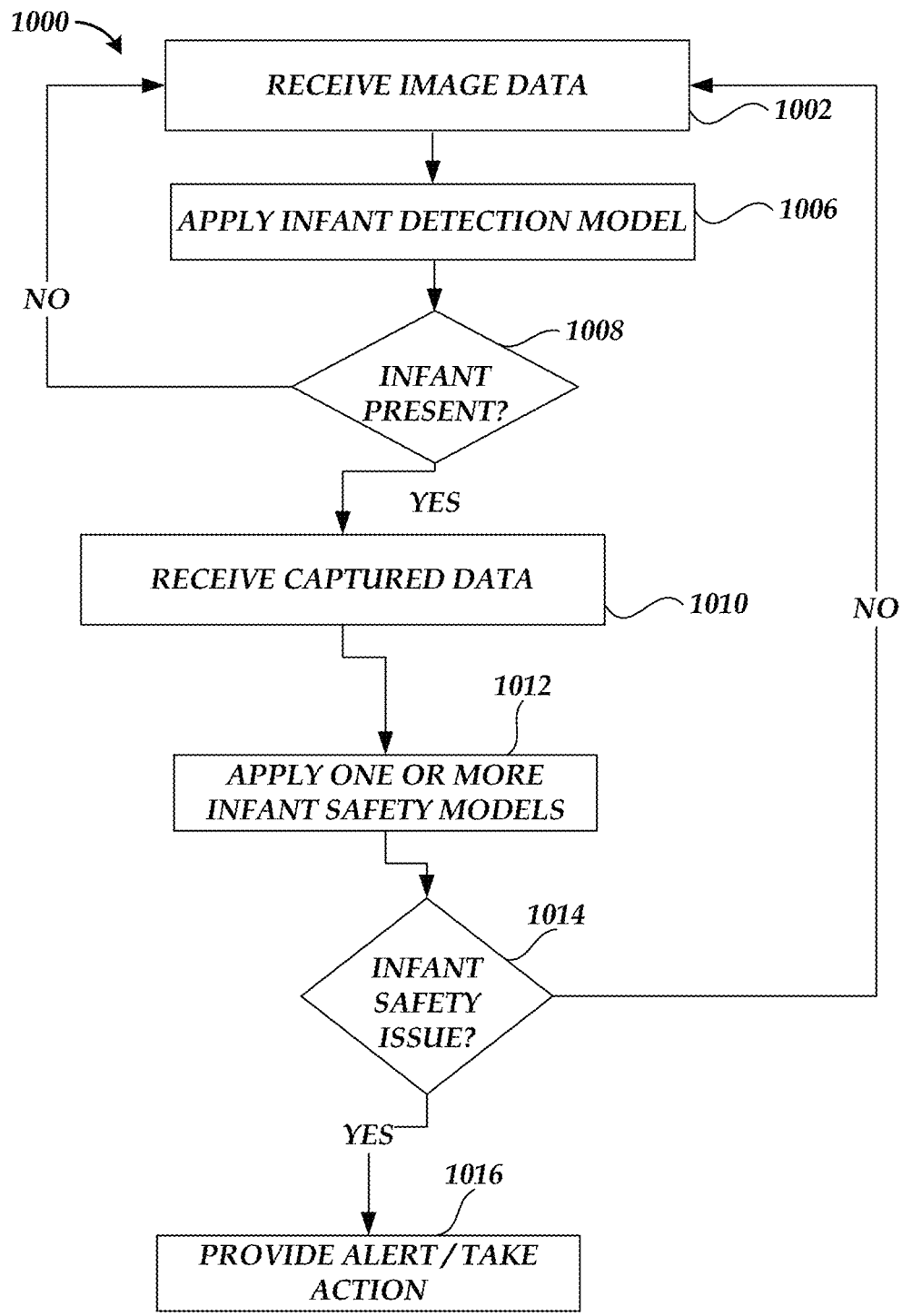
FIG. 10 is a flowchart of a method for efficiently applying machine learning models for infant care.

Some of the aspects described herein can be directed towards infant care features. The monitoring systems described herein can be applied to monitoring an infant. FIG. 10 is a flowchart of a method 1000 for efficiently applying machine learning models for infant care, according to some aspects of the present disclosure. As described herein, a monitoring system, which can include a camera system, may implement aspects of the method 1000 as described herein. The block(s) of the method 1000 of FIG. 10 can be similar to the block(s) of the methods 800, 900 of FIGS. 8 and/or 9. The method 1000 may include fewer or additional blocks and/or the blocks may be performed in order different than is illustrated.

Beginning at block 1002, image data can be received. A camera system can receive image data from a camera, which can be positioned in an infant area, such as a nursery. Image data can also include, but is not limited to, a sequence of images. A camera in a camera system can continuously capture images of the infant area. Therefore, the camera in a camera system can capture images of objects, such as an infant, in a room either at a home or a clinical facility.

At block 1006, an infant detection model can be applied. The camera system can apply the infant detection model based on the image data. In some aspects, the camera system can invoke the infant detection model on a hardware accelerator. The infant detection model can be configured to receive image data as input. The infant detection model can be configured to output a classification result. In some aspects, the classification result can indicate a likelihood (such as a percentage chance) that the image data includes an infant. In other aspects, the classification result can be a binary result: either the infant object is predicted as present in the image or not. The infant detection model can be, but is not limited to, a CNN. The infant detection model can be trained to detect persons. For example, the infant detection model can be trained with a training data set with labeled examples indicating whether the input data includes an infant or not.

At block 1008, it can be determined whether an infant is present. The camera system can determine whether an infant is present. The camera system can determine whether an infant object is located in the image data. The camera system can receive from the infant detection model the output of a classification result. In some aspects, the output can be a binary result, such as, "yes" there is an infant object present or "no" there is not an infant object present. In other aspects, the output can be a percentage result and the camera system can determine the presence of an infant if the percentage result is above a threshold. If an infant is detected, the method 1000 proceeds to the block 1010 to receive captured data. If an infant is not detected, the method 1000 proceeds to repeat the previous blocks 1002, 1006, 1008 to continue checking for infants.

At block 1010, captured data can be received. The camera in the camera system can continuously capture images, which can lead to the captured data. In some aspects, the camera system can receive audio data from a microphone.

At block 1012, one or more infant safety models can be applied. In response to detecting an infant, the camera system can apply one or more infant safety models that outputs a model result. The camera system can invoke (which can be invoked on a hardware accelerator) an infant position model based on the captured data. The infant position model can output a classification result. In some aspects, the infant position model can be or include a CNN. In response to detecting an infant, the camera system can invoke a facial feature extraction model based on second image data where the facial feature extraction model outputs a facial feature vector. The camera system can execute a query of a facial features database based on the facial feature vector where executing the query indicates that the facial feature vector is not present in the facial features database. An infant safety model can be an infant color detection model. In some aspects, the model result can include coordinates of a boundary region identifying an infant object in the image data. As described herein, the camera system can invoke a loud noise detection model based on the audio data where the loud noise detection model can output a classification result.

At block 1014, it can be determined whether there is an infant safety issue. The camera system can determine whether there is an infant safety issue. As described above, for each person safety model that is invoked, the camera system can receive a model result as output. For some models, the output can be a binary result, such as, "yes" an infant is in a supine position or "no" a supine position has not been detected (such as the infant potentially laying on their stomach). For other models, the output can be a percentage result and the camera system can determine an infant safety issue exists if the percentage result is above a threshold. The camera system can determine that an unrecognized person has been detected. In some aspects, the camera system determine that the coordinates of the boundary region exceed a threshold distance from an infant zone (which can indicate that an infant is being removed from the infant zone). The camera system can determine a potential scream from the model result. In some aspects, evaluation of the one or more infant safety models can result in an issue detection if at least one model returns a result that indicates issue detection. If an infant safety issue is detected, the method 1000 proceeds to block 1016 to provide an alert and/or take an action. If an infant safety issue is not detected, the method 1000 proceeds to repeat the previous blocks 1002, 1006, 1008 to continue checking for infants.

At block 1016, an alert can be provided and/or an action can be taken. In some aspects, the camera system can initiate an alert associated with the infant. The camera system can notify a monitoring system to provide an alert. In some aspects, a user computing device 102 can receive an alert about an infant safety issue. In some aspects, a clinician 110 can receive an alert about the infant safety issue. In some aspects, the camera system can initiate an action. The camera system can cause the monitoring system to take an action. For example, the monitoring system can automatically notify emergency services (such as an emergency hotline and/or an ambulance service) to send someone to help.

At Home Features

Some of the aspects described herein can be directed towards at-home monitoring features. The monitoring systems described herein can be applied to monitoring in a home. The monitoring system can accomplish one or more of the following features using the machine learning techniques described herein. The monitoring system can monitor the time spent on various tasks by members of a household (such as youth at home), such as time spent watching television or time spent studying. The monitoring system can be configured to confirm that certain tasks (such as chores) are completed. In some aspects, the monitoring system can allow parents to monitor an amount of time spent using electronics. In some aspects, the camera system can be configured to detect night terrors and amount and types of sleep. As described herein, in some aspects, the monitoring system can track usage of good hygiene practices at home, such as but not limited to, handwashing, brushing teeth, or showering (e.g., tracking that a person enters a bathroom at a showering time). As described herein, zones can be used to provide alerts, such as monitoring a pool zone or other spaces youth should not be allowed, such as, but not limited to, certain rooms at certain times and/or unaccompanied by an adult. For example, the camera system can monitor a gun storage location to alert adults to unauthorized access of weapons.

General Features

Some of the aspects described herein can include any of the following features, which can be applied in different settings. In some aspects, a camera system can have local storage for an image and/or video feed. In some aspects, remote access of the local storage may be restricted and/or limited. In some aspects, the camera system can use a calibration factor which can be useful for correcting color drift in the image data from a camera. In some aspects, the camera system can add or remove filters on camera to provide certain effects. The camera system may include infrared filters. In some aspects, the monitoring system can monitor food intake of subject and/or estimate calories. In some aspects, the monitoring system can detect mask wearing (such as wearing or not wearing an oxygen mask).

The monitoring system can perform one or more check-up tests. The monitoring system, using a machine learning model, can detect slurred speech, drunkenness, drug use, and/or adverse behavior. Based on other check-up tests the monitoring system can detect shaking, microtremors, tremors, which can indicate a potential disease state such as Parkinson's. The monitoring system can track exercise movements to determine a potential physiological condition. A check-up test can be used by the monitoring system for a cognitive assessment, such as, detecting vocabulary decline. In some aspects, the monitoring system can check a user's smile where the monitoring system prompts the user to stand a specified distance away from the camera system. A check-up test can request a subject to do one or more exercise, read something outload (to test muscles of a face), reach for an object. In some aspects, the camera system can perform an automated physical, perform a hearing test, and/or perform an eye test. In some aspects, a check-up test can be for Alzheimer's detection. The monitoring system can provide memory exercises, monitor for good/bad days, and/or monitor basic behavior to prevent injury. In some aspects, the camera system can monitor skin color changes to detect skin damage and/or sunburn detection. The camera system can take a trend of skin color, advise or remind to take corrective action, and/or detect a tan line. The monitoring system can monitor sleep cycles and/or heart rate variability. In some aspects, the monitoring system can monitor snoring, rapid eye movement (REM), and/or sleep quality, which can be indicative of sleep apnea or another disease. As described herein, the camera system can be tried to detect sleep walking. The camera system can be configured to detect coughing or sneezing to determine potential allergies or illness. The camera system can also provide an alert if a possible hyperventilation is detected. Any of the monitoring features described herein can be implemented with the machine learning techniques described herein.

Additional Implementation Details

Figure 11:
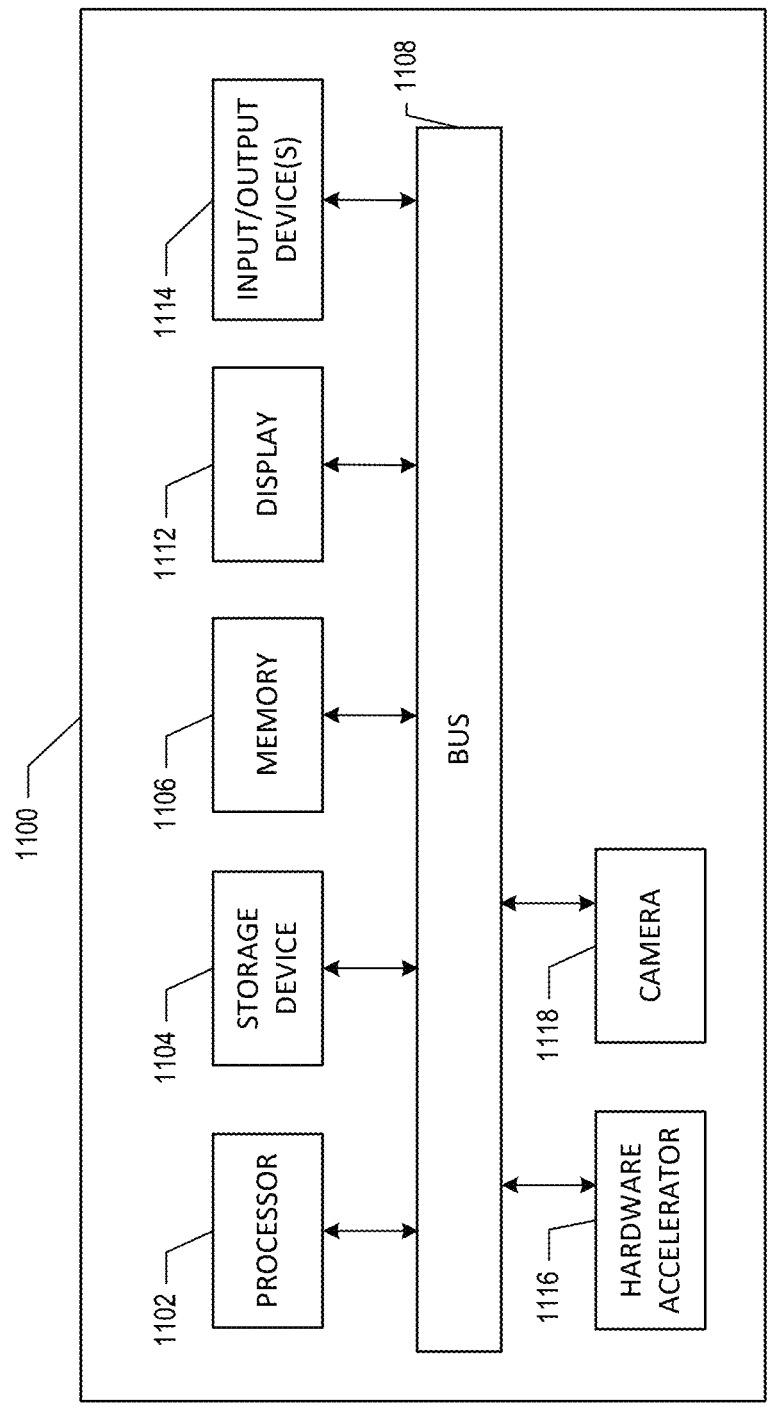
FIG. 11 illustrates a block diagram of a computing device that may implement one or more aspects of the present disclosure.

FIG. 11 is a block diagram that illustrates example components of a computing device 1100, which can be a camera system. The computing device 1100 can implement aspects of the present disclosure, and, in particular, aspects of the monitoring system 100A, 100B, such as the camera system 114. The computing device 1100 can communicate with other computing devices.

The computing device 1100 can include a hardware processor 1102, a hardware accelerator, a data storage device 1104, a memory device 1106, a bus 1108, a display 1112, one or more input/output devices 1114, and a camera 1118. A processor 1102 can also be implemented as a combination of computing devices, e.g., a combination of a digital signal processor and a microprocessor, a plurality of microprocessors, one or more microprocessors in conjunction with a digital signal processor, or any other such configuration. The processor 1102 can be configured, among other things, to process data, execute instructions to perform one or more functions, such as apply one or more machine learning models, as described herein. The hardware accelerator 1116 can be special hardware that is configured to accelerate machine learning applications. The data storage device 1104 can include a magnetic disk, optical disk, or flash drive, etc., and is provided and coupled to the bus 1108 for storing information and instructions. The memory 1106 can include one or more memory devices that store data, including without limitation, random access memory (RAM) and read-only memory (ROM). The computing device 1100 may be coupled via the bus 1108 to a display 1112, such as an LCD display or touch screen, for displaying information to a user, such as a patient. The computing device 1100 may be coupled via the bus 1108 to one or more input/output devices 1114. The input device 1114 can include, but is not limited to, a keyboard, mouse, digital pen, microphone, touch screen, gesture recognition system, voice recognition system, imaging device (which may capture eye, hand, head, or body tracking data and/or placement), gamepad, accelerometer, or gyroscope. The camera 1118 can include, but is not limited to, a 1080p or 4k camera and/or an infrared image camera.

Additional Aspects and Terminology

As used herein, the term "patient" can refer to any person that is monitored using the systems, methods, devices, and/or techniques described herein. As used herein, a "patient" is not required—to be admitted to a hospital, rather, the term "patient" can refer to a person that is being monitored. As used herein, in some cases the terms "patient" and "user" can be used interchangeably.

While some features described herein may be discussed in a specific context, such as adult, youth, infant, elderly, or pet care, those features can be applied to other contexts, such as, but not limited to, a different one of adult, youth, infant, elderly, or pet care contexts.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conditional language used herein, such as, among others, "can," "might," "may," "e.g.," "for example," and the like, unless specifically stated otherwise, or otherwise understood within the context as used, is generally intended to convey that certain aspects described herein include, while other aspects described herein do not include, certain features, elements, or states. Thus, such conditional language is not generally intended to imply that features, elements, or states are in any way required for one or more aspects described herein.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Such disjunctive language is not generally intended to, and should not, imply that certain aspects require at least one of X, at least one of Y, or at least one of Z to each be present. Thus, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The terms "comprising," "including," "having," and the like are synonymous and are used inclusively, in an open-ended fashion, and do not exclude additional elements, features, acts, operations, and so forth.

While the above detailed description has shown, described, and pointed out novel features as applied to various aspects described herein, it will be understood that various omissions, substitutions, and changes in the form and details of the devices or algorithms illustrated can be made without departing from the spirit of the disclosure. As will be recognized, certain aspects described herein can be embodied within a form that does not provide all of the features and benefits set forth herein, as some features can be used or practiced separately from others.

What is claimed is:

1. A system comprising:
    a storage device configured to store first instructions and second instructions;
    a camera;
    a microphone;
    a hardware accelerator configured to execute the first instructions; and
    a hardware processor configured to execute the second instructions to:
        receive, from the camera, first image data;
        invoke, on the hardware accelerator, a person detection model based on the first image data, wherein the person detection model outputs first classification result;
        detect a person based on the first classification result;
        receive, from the camera, second image data; and
        in response to detecting the person,
            invoke, on the hardware accelerator, a fall detection model based on the second image data, wherein the fall detection model outputs a second classification result,
            detect a potential fall based on the second classification result, and
            in response to detecting the potential fall, provide an alert;
        receive, from the microphone, audio data; and
        in response to detecting the person, invoke, on the hardware accelerator, a loud noise detection model based on the audio data, wherein the loud noise detection model outputs a third classification result, detect a potential scream based on the third classification result, and in response to detecting the potential scream, provide a second alert.

2. The system of claim 1, wherein the second alert is an escalated alert and is in response to detecting both the potential fall and the potential scream.

3. The system of claim 1, wherein invoking the loud noise detection model based on the audio data further comprises:

generating spectrogram data from the audio data; and providing the spectrogram data as input to the loud noise detection model.

4. The system of claim 1, wherein the second image data comprises a plurality of images.

5. A method comprising:

receiving, from a camera, first image data;

invoking, on a hardware accelerator, a person detection model based on the first image data, wherein the person detection model outputs first classification result;

detecting a person based on the first classification result;

receiving, from the camera, second image data; and in response to detecting the person, invoking, on the hardware accelerator, a plurality of person safety models based on the second image data, for each person safety model from the plurality of person safety models, receiving, from the hardware accelerator, a second classification result, detecting a potential safety issue based on a particular second classification result, and in response to detecting the potential safety issue, providing an alert;

receiving, from a microphone, audio data; and in response to detecting the person, invoking, on the hardware accelerator, a loud noise detection model based on the audio data, wherein the loud noise detection model outputs a third classification result, detecting a potential scream based on the third classification result, and in response to detecting the potential safety issue and the potential scream, providing an escalated alert.

6. The method of claim 5, further comprising:

in response to detecting the person, invoking, on the hardware accelerator, a facial feature extraction model based on the second image data, wherein the facial feature extraction model outputs a facial feature vector, executing a query of a facial features database based on the facial feature vector, wherein executing the query indicates that the facial feature vector is not present in the facial features database, and in response to determining that the facial feature vector is not present in the facial features database, providing an unrecognized person alert.

7. The method of claim 5, wherein the plurality of person safety models comprises a fall detection model, further comprising:

collecting a first set of videos of person falls;

collecting a second set of videos of persons without falling;

creating a training data set comprising the first set of videos and the second set of videos; and training the fall detection model using the training data set.

8. The method of claim 5, wherein the plurality of person safety models comprises a handwashing detection model, further comprising:

collecting a first set of videos with handwashing;

collecting a second set of videos without handwashing;

creating a training data set comprising the first set of videos and the second set of videos; and training the handwashing detection model using the training data set.

9. The method of claim 5, further comprising:

collecting a first set of videos with screaming;

collecting a second set of videos without screaming;

creating a training data set comprising the first set of videos and the second set of videos; and training the loud noise detection model using the training data set.

10. A system comprising:

a storage device configured to store first instructions and second instructions;

a camera;

a microphone;

a hardware accelerator configured to execute the first instructions; and a hardware processor configured to execute the second instructions to:

receive, from the camera, first image data;

invoke, on the hardware accelerator, a person detection model based on the first image data, wherein the person detection model outputs first classification result;

detect a person based on the first classification result;

receive, from the camera, second image data; and in response to detecting the person, invoke, on the hardware accelerator, a fall detection model based on the second image data, wherein the fall detection model outputs a second classification result, detect a potential fall based on the second classification result, and in response to detecting the potential fall, provide an alert;

receive, from the microphone, audio data; and in response to detecting the person, invoke, on the hardware accelerator, a loud noise detection model based on the audio data, wherein the loud noise detection model outputs a third classification result, detect a potential scream based on the third classification result, wherein invoking the loud noise detection model based on the audio data further comprises:

generating spectrogram data from the audio data; and providing the spectrogram data as input to the loud noise detection model.

11. The system of claim 10, wherein the hardware processor is configured to execute additional instructions to:

in response to detecting the potential scream, provide a second alert.

12. The system of claim 10, wherein the hardware processor is configured to execute additional instructions to:

in response to detecting the potential fall and the potential scream, provide an escalated alert.

13. The system of claim 10, wherein the second image data comprises a plurality of images.

14. A method comprising:
receiving, from a camera, first image data;
invoking, on a hardware accelerator, a person detection model based on the first image data, wherein the person detection model outputs first classification result;
detecting a person based on the first classification result;
receiving, from the camera, second image data; and
in response to detecting the person,
    invoking, on the hardware accelerator, a plurality of person safety models based on the second image data,
    for each person safety model from the plurality of person safety models,
receiving, from the hardware accelerator, a second classification result,
    detecting a potential safety issue based on a particular second classification result, and
    in response to detecting the potential safety issue, providing an alert;
receiving, from a microphone, audio data; and
in response to detecting the person,
    invoking, on the hardware accelerator, a loud noise detection model based on the audio data, wherein the loud noise detection model outputs a third classification result, and
    detecting a potential scream based on the third classification result,
collecting a first set of videos with screaming;
collecting a second set of videos without screaming;
creating a training data set comprising the first set of videos and the second set of videos; and
training the loud noise detection model using the training data set.

15. The method of claim 14, further comprising:
in response to detecting the person,
    invoking, on the hardware accelerator, a facial feature extraction model based on the second image data, wherein the facial feature extraction model outputs a facial feature vector,
    executing a query of a facial features database based on the facial feature vector, wherein executing the query indicates that the facial feature vector is not present in the facial features database, and
    in response to determining that the facial feature vector is not present in the facial features database, providing an unrecognized person alert.

16. The method of claim 14, wherein the plurality of person safety models comprises a fall detection model, further comprising:
collecting a first set of videos of person falls;
collecting a second set of videos of persons without falling;
creating a training data set comprising the first set of videos and the second set of videos; and
training the fall detection model using the training data set.

17. The method of claim 14, wherein the plurality of person safety models comprises a handwashing detection model, further comprising:
collecting a first set of videos of with handwashing;
collecting a second set of videos without handwashing;
creating a training data set comprising the first set of videos and the second set of videos; and
training the handwashing detection model using the training data set.

18. The method of claim 14, further comprising:
in response to detecting the potential safety issue and the potential scream, providing an escalated alert.

* * * * *